(12) United States Patent
Jain et al.

(10) Patent No.: US 12,526,834 B2
(45) Date of Patent: Jan. 13, 2026

(54) METHODS AND SYSTEMS FOR ULTRA-WIDEBAND LOCALIZATION

(71) Applicant: Robert Bosch GmbH, Stuttgart (DE)

(72) Inventors: Vivek Jain, Sunnyvale, CA (US); Sushanta Mohan Rakshit, Santa Clara, CA (US)

(73) Assignee: Robert Bosch GmbH (DE)

( * ) Notice: Subject to any disclaimer, the term of this patent is extended or adjusted under 35 U.S.C. 154(b) by 629 days.

(21) Appl. No.: 17/957,534

(22) Filed: Sep. 30, 2022

(65) Prior Publication Data

US 2024/0114542 A1 Apr. 4, 2024

(51) Int. Cl.
| | | |
|---|---|---|
| *H04W 72/542* | (2023.01) | |
| *H04W 72/51* | (2023.01) | |
| *H04W 72/53* | (2023.01) | |
| *H04W 72/563* | (2023.01) | |

(52) U.S. Cl.
CPC ......... *H04W 72/542* (2023.01); *H04W 72/51* (2023.01); *H04W 72/53* (2023.01); *H04W 72/563* (2023.01)

(58) Field of Classification Search
CPC ....... G01S 5/0284; H04W 4/02; H04W 72/51; H04W 72/53; H04W 72/542; H04W 72/563
See application file for complete search history.

(56) References Cited

U.S. PATENT DOCUMENTS

| | | | |
|---|---|---|---|
| 9,679,430 B2 | 6/2017 | O'Brien et al. | |
| 9,882,592 B2 * | 1/2018 | O'Hagan | ............ G06K 7/10227 |
| 9,894,492 B1 * | 2/2018 | Elangovan | ............ H04W 4/023 |
| 9,924,318 B2 | 3/2018 | Ghabra et al. | |
| 10,176,718 B1 * | 1/2019 | Mazuir | .................. G08G 1/205 |
| 10,573,104 B2 | 2/2020 | Jain et al. | |
| 11,277,166 B2 | 3/2022 | Zeng et al. | |
| 2013/0045750 A1 * | 2/2013 | Kim | .......................... G01S 5/14 |
| | | | 455/456.1 |

(Continued)

FOREIGN PATENT DOCUMENTS

WO   WO-2024025469 A1 *   2/2024

OTHER PUBLICATIONS

Gezici et al., "Localization via Ultra-Wideband Radios: A Look at Positioning Aspects for Future Sensor Networks," IEEE Signal Processing Magazine, Jul. 2005, 17 pages.

(Continued)

*Primary Examiner* — Awet Haile
(74) *Attorney, Agent, or Firm* — Dickinson Wright PLLC

(57) ABSTRACT

The systems and methods described herein provide a means for obtaining an accurate localization of static/mobile portable devices with respect to static/mobile infrastructure. A real-world environment presents unique challenges when localizing a given portable tag. Measurement of various geometric properties such as distance and/or angle to given infrastructure sensor is often erroneous due to process phasing of main paths and superimposition with various multipath reflected signals. These errors are not known beforehand and vary per environmental conditions. Therefore, performing localization in such scenarios is non-trivial. The systems and methods described herein will highlight several methods and possible algorithm process flows to improve performance.

20 Claims, 12 Drawing Sheets

(56) References Cited

U.S. PATENT DOCUMENTS

| | | | |
|---|---|---|---|
| 2020/0309932 A1 | 10/2020 | Zeng et al. | |
| 2020/0348406 A1 | 11/2020 | Jain et al. | |
| 2022/0191644 A1* | 6/2022 | Ledvina | H04W 4/023 |
| 2022/0214418 A1 | 7/2022 | Nguyen et al. | |
| 2022/0240168 A1 | 7/2022 | Somayazulu et al. | |
| 2022/0264514 A1* | 8/2022 | Butt | G01S 5/0244 |
| 2022/0381898 A1 | 12/2022 | Zhang et al. | |
| 2022/0383716 A1 | 12/2022 | Casamassima et al. | |
| 2023/0100617 A1 | 3/2023 | Kumari et al. | |
| 2023/0156429 A1 | 5/2023 | Terinek | |
| 2023/0341535 A1 | 10/2023 | Zhang et al. | |

OTHER PUBLICATIONS

Hu et al., "Adaptive Kalman Filtering for Vehicle Navigation," Journal of Global Positioning Systems, vol. 2, No. 1, 2003, 6 pages.

Yu et al., "A Guide of Fingerprint Based Radio Emitter Localization Using Multiple Sensors," IEICE Transactions on Communications, Apr. 2018, 19 pages.

Website Wikipedia, https://en.wikipedia.org/w/index.php?title=Condition_number&oldid=1083031469 "Condition number," Retrieved Apr. 19, 2022, 7 pages.

Website https://en.wikipedia.org/w/index.php?title=Global_optimization&oldid=1073891786 "Global optimization," Wikipedia, Retrieved Apr. 19, 2022, 8 pages.

Website https://en.wikipedia.org/w/index.php?title=Gradient&oldid=1078560728 "Gradient," Wikipedia, Retrieved Apr. 19, 2022, 12 pages.

Website https://en.wikipedia.org/w/index.php?title=Gradient_descent&oldid=1080901370 "Gradient descent," Wikipedia, Retrieved Apr. 19, 2022, 7 pages.

Website Wikipedia, https://en.wikipedia.org/w/index.php?title=Levenberg-Marquardt_algorithm&oldid=1067650382 "Levenberg-Marquardt algorithm," Retrieved Apr. 19, 2022, 7 pages.

Website Wikipedia, https://en.wikipedia.org/w/index.php?title=Limited-memory_BFGS&oldid=1082062663 "Limited-memory BFGS," Retrieved Apr. 19, 2022, 6 pages.

Website https://en.wikipedia.org/w/index.php?title=Triangle_inequality&oldid=1074965160 "Triangle inequality," Wikipedia, Retrieved Apr. 19, 2022, 12 pages.

"APS006 Part 3, Application Note, DW1000 Metrics for Estimation of Non Line Of Sight Operating Conditions," Decawave 2016, 21 pages.

Website https://www.noheatstroke.org/ "Heatstroke Deaths of Children in Vehicles", Updated Mar. 4, 2022, Retrieved Mar. 31, 2022, 3 Pages.

Website https://cdn.euroncap.com/media/30700/euroncap-roadmap-2025-v4.pdf Euro NCAP 2025 Roadmap In Pursuit of Vision Zero, Retrieved Mar. 31, 2022, 19 Pages.

Website https://web.archive.org/web/20201111191848/http://www.globalncap.org/wp-content/uploads/2017/06/Market-for-Vehicle-Safety.pdf "Creating a Global Market for Vehicle Safety", Retrieved from the Wayback Machine Mar. 31, 2022, Dated Nov. 11, 2020, 29 Pages.

Website http://www.globalncap.org/wp-content/uploads/2017/06/Market-for-Vehicle-Safety.pdf LEKACH., "Why your next car might track passengers with radar", Retrieved Mar. 31, 2022, Dated Apr. 25, 2021, 12 Pages.

Website https://www.futurecar.com/4551/The-FCC-Grants-Waiver-Requests-to-Six-Developers-of-Radar-based-Vehicle-Cabin-Monitors-Including-Tesla, "The FCC Grants Waiver Requests to Six Developers of Radar-based Vehicle Cabin Monitors, Including Tesla", Retrieved Mar. 31, 2022, Dated Apr. 14, 2021, 3 Pages.

Website https://www.caaresys.com/ "Transforming the Wellness Industry", Retrieved Mach 31, 2022, 3 Pages.

Website https://www.bosch-mobility-solutions.com/en/solutions/software-and-services/perfectly-keyless/ "Perfectly keyless, Precise wireless localization and secure key management", Retrieved Mar. 31, 2022, 10 Pages.

Kalyanaraman et al. "CaraoKey : Car States Sensing via the Ultra-Wideband Keyless Infrastructure," 2020 17th Annual IEEE International Conference on Sensing, Communication, and Networking (SECON), 2020, pp. 1-9.

Ma et al. "CarOSense: Car Occupancy Sensing with the Ultra-Wideband Keyless Infrastructure", Proc. ACM Interact. Mob. Wearable Ubiquitous Technol., vol. 4, No. 3, Article 91. Publication date: Sep. 2020, pp. 1-28.

* cited by examiner

METHODS AND SYSTEMS FOR ULTRA-WIDEBAND LOCALIZATION

TECHNICAL FIELD

The present disclosure relates to determining accurate localization of a portable device with respect to static infrastructure by measuring various geometric properties such as distance and/or angle between the portable device and the static infrastructure.

BACKGROUND

Several real-world applications such as access control, asset tracking, object finding, and the like, require accurate localization of an asset object. Such systems require calculating the location of a device in relation to another device. One device may be held by a user, where finding the location of the device also indicates the location of the user. The other device may be a device the user may wish to locate, or the device may perform some function based on the relative position of the user. For such a system to function, a means of long-term, long-range communication is required that is not resource-intensive.

Typically, such applications, including various wireless applications, may estimate physical parameters, such as range or angle of a device with respect to other devices. The range is generally estimated by measuring device signal strength or utilizing signal arrival times at the device. This low energy communication makes such a system possible, however, accurate localization outside of ideal conditions may be prone to errors or inaccuracy.

SUMMARY

The system and methods described herein provide for obtaining accurate localization of a portable device with respect to static infrastructure by measuring various geometric properties such as distance and/or angle between the portable device and the static infrastructure.

An aspect of the disclosed embodiments includes a method for localizing a signal. The method includes receiving, for each sensor of a plurality of sensors, one or more localization values indicating an estimated distance between a tag device and a respective sensor of the plurality of sensors. The method also includes identifying a first sensor of the plurality of sensors having a localization value that is less than localization values associated with each other sensor of the plurality of sensors. The method also includes identifying, based on the first sensor and a geometric relationship between the first sensor and the plurality of sensors, a subset of sensors of the plurality of sensors. The method also includes calculating an estimated location of the tag device relative to the subset of sensors based on one or more distances between the first sensor and at least two other sensors of the subset of sensors.

Another aspect of the disclosed embodiments includes a system for localizing a signal. The system includes a processor and a memory. The memory includes instructions that, when executed by the processor, cause the processor to receive, for each sensor of a plurality of sensors, one or more localization values indicating an estimated distance between a tag device and a respective sensor of the plurality of sensors. The system further identifies a first sensor of the plurality of sensors having a localization value that is less than localization values associated with each other sensor of the plurality of sensors. The system further identifies based on the first sensor and a geometric relationship between the first sensor and the plurality of sensors, a subset of sensors of the plurality of sensors. The system further calculates an estimated location of the tag device relative to the subset of sensors based on one or more distances between the first sensor and at least two other sensors of the subset of sensors.

Another aspect of the disclosed embodiments includes an apparatus for localizing a signal. The apparatus includes a processor and a memory. The memory includes instructions that, when executed by the processor, cause the processor to receive, for each sensor of a plurality of sensors, one or more localization values indicating an estimated distance between a tag device and a respective sensor of the plurality of sensors. The apparatus identifies a first sensor of the plurality of sensors having a localization value that is less than localization values associated with each other sensor of the plurality of sensors. The apparatus also identify, based on the first sensor and a geometric relationship between the first sensor and the plurality of sensors, a subset of sensors of the plurality of sensors. The apparatus also calculate an estimated location of the tag device relative to the subset of sensors based on one or more distances between the first sensor and at least two other sensors of the subset of sensors. The apparatus also, in response to determining that a threshold number of consecutive localization values from a respective sensor of the plurality of sensors have an invalid value, disregarding localization values from the respective sensor. The apparatus determines whether the estimated location of the tag device is in an area of interest having a prestored radio frequency fingerprinting datum. The apparatus also update the estimated location of the tag device based on comparing a received radio frequency signal with the prestored radio frequency fingerprinting datum.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Several real-world applications such as access control, asset tracking, object finding, and the like, require accurate localization of an asset object. Such systems require calculating the location of a device in relation to another device. One device may be held by a user, where finding the location of the device also indicates the location of the user. The other device may be a device the user may wish to locate, or the device may perform some function based on the relative position of the user. For such a system to function, a means of long-term, long-range communication is required that is not resource-intensive.

Typically, a real-world application, including various wireless applications, may estimate physical parameters such, as range or angle of a device with respect to other devices. The range is generally estimated by measuring device signal strength or utilizing signal arrival times at the device. This low energy communication makes such a system possible, however, accurate localization outside of ideal conditions may be prone to errors and/or inaccuracy.

Figure 3:
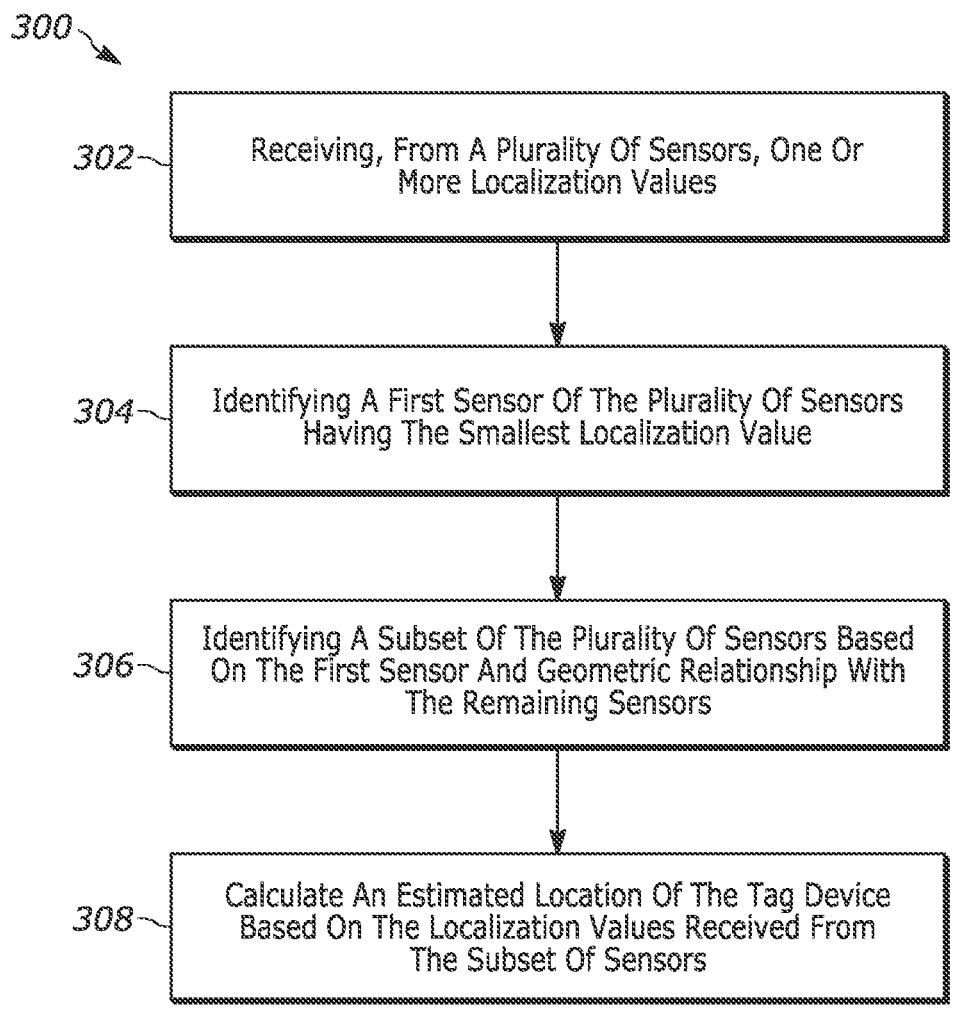
FIG. 3 is a flow chart that generally illustrates the process for calculating a location of a tag device, according to the principles of the present disclosure.

Accordingly, systems and methods such as those described herein, configured to provide accurate localization of a first device relative to another device, may be desirable. The systems and methods described herein may be configured to improve localization accuracy. Since raw data acquisition, which is used for localization, is erroneous, the systems and methods described herein may be configured to pre-process the data before performing localization. The systems and methods described herein may be configured to verify, after a location is estimated, the estimated location. The systems and methods described herein may be configured to provide data pre-processing and/or situation specific heuristics in the basic algorithm process flow (as shown in FIG. 3).

The systems and methods described herein may be configured to apply a filter to the outputs of the sensors, such as a Kalman filter or other suitable filter. A Kalman filter observes the sensor readings over time and uses joint probability distribution in order to estimate variables for each time frame. The estimated results of the Kalman filter tend to be more accurate than the raw measurements. The systems and methods described herein may be configured to use one or more adaptive Kalman filters, which may improve the performance for static and/or dynamic scenarios. The systems and methods described herein may be configured to operate under static and/or dynamic use cases. For example, the systems and methods may be configured to determine a location of a tag device (e.g., a key fob, mobile phone, sensor tag, other suitable tag device) relative to one or more sensors on a vehicle. The sensors may include any suitable sensors, measurement devices, and/or other suitable mechanisms. For example, the sensors may include one or more position sensors, one or more torque sensors, one or more audio sensors, one or more image capturing sensors, one or more speed sensors, one or more temperature sensors, any other suitable sensor, one or more proximity sensors, or a combination thereof. The one or more sensors may be associated with one or more motors of the vehicle, a propulsion system of the vehicle, an emissions system of the vehicle, a transmission of the vehicle, a keyless entry system of the vehicle, a theft deterrent system of the vehicle, and/or any other suitable system or component of the vehicle. In some embodiments, the one or more sensors may be configured to generate various signals, such as measuring signals and/or sensor information signals (e.g., such as localization signals, as described herein). The one or more sensors may be configured to communicate the one or more signals using any suitable method and/or technology. For example, the one or more signals may communicate the one or more signals using a wireless system comprising any suitable wireless technology, such as ultra-wideband or other suitable wireless technology.

In a static use case, the user having the tag device is stationary with respect to the vehicle (such as when the user is sitting in the vehicle). In a dynamic scenario, the user is moving in relation to the vehicle (such as when a user is walking away from or toward the vehicle).

The systems and methods described herein may be configured to include a history process. The history process is configured to store various historical data received from the sensors. There is a possibility of missing a reading from a sensor in the previous round. Missing readings happen due to fading, when the path between the tag device and a given sensor may be process-interrupted by an object intermittently. For example, fading may occur when a door opens or closes on a car, placement of a tag device on a person who is moving and when the human body comes in between the tag device and a given sensor. The systems and methods described herein may be configured to store values from the past few readings per sensor. For example, up to the past five readings from a sensor may be maintained. The systems and methods described herein may be configured to reset the value of the sensor to zero when half of those last few readings are missed along with the current one.

The systems and methods described herein may be configured to use prestored historical data to make a determination regarding whether there exists permanent fading for a sensor or that the sensor is out of range. The systems and methods described herein may be configured to take a minimum, a maximum, a mean, and/or a last value from a set of historical data collected in the history process (when sensors are intermittent from the historical data). For example, when readings in the set are (5, 3, Ø, 1, Ø) the possible output of this process could be 1, 5, 4.5, or 1, respectively (where Ø was the reading from the current round). However, when historical data is used after the Kalman filter has been applied to the sensor readings, the systems and methods described herein may be configured to use the output of the Kalman filter when the input value was valid. Additionally, or alternatively, when the Kalman filter is used prior to or after considering the history data, the filter is reset when the majority of readings in the set are Ø (e.g., or a pre-determined invalid value) including the current one. The systems and methods described herein may be configured to always use a valid value. Historical data is used only when there is no current input from a sensor. The systems and methods described herein may be configured to decide to use the mean of valid values for a localization calculation within the set as a smoothing value irrespective of Kalman filter was activated or not.

The systems and methods described herein may be configured to operate in a static and/or dynamic scenario. However, usage of a Kalman filter results in user experience issues (e.g., fast dynamic cases in addition to general static and/or dynamic cases). For example, a user having the tag device approaching a vehicle is a highly dynamic scenario (as compared to a driver moving around the vehicle) and the relative ranges between the tag device and sensors change with smaller values, unlike case of the driver approaching.

In such cases, the systems and methods described herein may be configured to measure variance between subsequent readings (range, angle, and/or signal strength) of the tag device and sensors. The systems and methods described herein may, when jitters between subsequent readings are more than the pre-defined thresholds, be configured to reset the filter or the parameters may be selected that are more appropriate for dynamic scenarios. For example, when the majority of subsequent range estimates for the new position differ by more than 10 cm as compared to previous range estimates, the filter may be reset, disabled, or readjusted.

The systems and methods described herein may be configured to perform parameter estimation correction (e.g., to account for erroneous estimates, performing filtering may help with outliers and provide improved performance). However, the readings already contain estimation errors. Hence, there is a need for direct methods to correct estimation errors.

The systems and methods described herein may be configured to perform a range estimation correction process. The systems and methods described herein may be configured to utilize triangle inequality. The length of any side of a triangle is smaller than the sum of two other sides. In estimating the ranges between a given tag device and sensors, the range from any sensor may not be greater than the sum of the estimated range between the tag device and nearest sensor (i.e., the shortest reported range by any sensor) and the range between that sensor and nearest sensor. The systems and methods described herein may be configured to utilize a sum of ranges that may be equal when the two sensors and tag device are on a line passing through all three in a 3D coordinate system. The systems and methods described herein may be configured to set the range of the sensor to the sum of the values or the sum multiplied with a small compensation factor (e.g. 0.95). Even the shortest range is an accurate one if a given sensor reports a range that is great than the sum of the ranges (between this sensor and nearest sensor and between the nearest sensor and tag device).

The systems and methods described herein may be configured to perform direct compensation for each sensor. The systems and methods described herein may be configured to include a common compensation factor for all reported ranges (such as 0.9). All estimated ranges are multiplied by this factor for each reporting sensor. The application of the compensation factor (e.g., with values less than or other suitable value) resulting in both mean and standard deviation reduction. The compensation factor may also be a chosen value depending on the quality of input signal for the tag device distance.

The systems and methods described herein may be configured to evaluate the quality of the input signal based on line of sight (LOS) and no line of sight (NLOS) signals for localization calculations. For localization calculations, LOS signals may be determined and compensated for. That compensation is reduced when a calculated NLOS signal is higher than the LOS signal. Further values (e.g., received signal strength, the ratio of peak power to average power, and the like) may also be used to determine signal quality.

The systems and methods described herein may be configured to determine a tag device distance estimation from at least one sensor. Larger distance estimations may be compensated for with larger factors. Similarly, smaller distance estimations may be compensated for with a smaller factor. The systems and methods described herein may be configured to perform error distribution and/or bias compensation. Based on collected sample data the systems and methods described herein may determine, the mean of identified errors and compensate input ranges by the mean value of identified errors. The systems and methods described herein may be configured to shift the entire error distribution with a positive mean to a zero-mean value. In such cases, there is a chance for underreported ranges. Error distribution may be based on a specific sensor or a specific order in the set based on the shortest range (e.g., distribution of errors for shortest reporting sensors, second shortest reporting sensors, and the like). The above may be combined to affect both the mean and standard deviation of reported errors. Additionally, or alternatively, compensation factor can be calculated by the selecting a factor that reduces and/or minimizes the overall mean error of the error distribution. This mean error may include a signed mean error, absolute mean error, or root mean square error of the error distribution. Additionally, or alternatively, error distributions may be produced for the all data or specific categories of the data based on range, power values, LOS/NLOS, per sensor, and/or sensor order (e.g., as described) to obtain respective compensation factors and/or mean errors.

The systems and methods described herein may be configured to be used individually or separately before or after selecting sensors for localization. Further, a range threshold may also be defined where compensation techniques are applied, but only when the reported range is greater than the threshold.

The systems and methods described herein may be configured to perform angle estimation correction, time of arrival (ToA) estimation correction, and time distance of arrival (TDoA) estimation correction. The systems and methods described herein may be configured to perform error distribution and/or bias compensation. Similar to the range correction process, based on collected sample data, the bias compensation determines the mean of reported errors. Accordingly, the systems and methods described herein may be configured to compensate all input estimations by that mean value. The compensation shifts the entire error distribution towards a zero-mean value which may lead to underreported ranges.

The systems and methods described herein may be configured to perform parameter correction based on a received signal and hardware properties. Several hardware properties may affect the desired parameters such as when the signal was received, the angle of a received signal, and the quality of the received signal. Hardware properties such as antenna characteristics and onboard clocks resolution and/or stability affect the desired parameters. Several of these effects may be measured and compensated by the radio in the chip. However, packaging and sensor installation may lead to additional performance effects. Not all of these effects may be measured with the usage of advanced signal processing and machine learning; the systems and methods described herein may further compensate for these effects.

The systems and methods described herein may be configured to include a sensor selection process. When sensors are reporting erroneous ranges, the systems and methods described herein may select the best sensors. The systems and methods described herein may be configured to utilize several ways of selecting sensors for localization. The systems and methods described herein may be configured to include at least three sensors for 2D localization and four sensors for 3D localization, respectively when using range and angle as input parameters. In a case where the time difference of arrival (TDOA) may be used, an additional sensor is used for localization for both cases. The systems and methods described herein may be configured to utilize a hybrid method.

The systems and methods described herein may be configured to include the following ways to select input sensors. The systems and methods described herein may be configured to select sensors based on the lowest range reporting sensors. The lowest range reporting sensors may have minimum errors. The systems and methods described herein may be configured to select sensors based on the highest power reporting sensors. The received power may also be an indicator of shorter ranges, and a good line of sight for the signal. However, based on where sensors are installed and the conditions of the tag device environment; other ways may be used.

The systems and methods described herein may be configured to include the following ways to determine which sensors are reporting the best signal quality. When determining which sensors are reporting the best signal quality, the LOS and/or NLOS determination may be used to determine signal quality and received power. Further, values such as received signal strength, the ratio of peak power to average power, and the like may also be used to determine signal quality.

The systems and methods described herein may be configured to include a combination of lowest range, highest power, and highest signal quality reporting sensors when determining which subset of sensors to use. For example, a 3D localization picks the three lowest range reporting sensors and picks the fourth one based on the highest reporting power and/or signal quality from the remaining sensors.

The systems and methods described herein may be configured to include selection of a sensor group based on the symmetry of their relative locations. A balanced installation topology provides a more stable localization in comparison with an unbalanced topology.

The systems and methods described herein may be configured to utilize a condition number. A condition number is a measure of the magnitude of error in a final localization determination, based on the errors of the input ranges. A higher condition number indicates an error in the input range estimation which will lead to an impact on the localization output. This is especially true when localization is calculated using systems of equations for range-based localization.

The systems and methods described herein may be configured to utilize a preferred group of sensors. Geometry and/or condition number may be used to pre-select a set of sensor groups to be used for localization based on a system of equations. The output of a system of equations may be used as a localization output or seeding point for minimization algorithms The preferred sensor group is selected based in part on the shortest-range reporting sensor. In the case of a tie between two or more sensor groups, the systems and methods described herein may select the sensor group with the smallest sum of ranges reported by the sensor group with the shortest-range reporting sensor. Set the sensors reporting the best signal quality or reporting the highest signal power may also be chosen as the preferred sensor group or the parameters may also be chosen to break the tie (when selection is based on other methods). Sensor groups satisfying geometry with a condition number that is less than four are preferred.

The systems and methods described herein may be configured to perform Cramer-Rao Lower Bound (CRLB) based localization calculation of selecting sensors for providing an input to the minimization algorithm. CLRB integrates the effects of relative geometry of the calculated seeding point (best estimate of the initial location of the tag device) and the sensors which responded in the particular ranging iteration. The process yields 'n' sensors (where n>=3), which are geometrically preferred for the minimization algorithm. The process is preferably suited to extract information from multiple ranging observations at any instantaneous position of the tag device. However, the systems and methods described herein may be configured to perform an approximation using a signal-ranging observation. The mathematical tool used for this approximation of a pair of responding sensors with respect to the calculated seed point is called geometric conditioning. Geometric conditioning assists in excluding sensors exhibiting collinearity and/or co-planarity that negatively impacts the accuracy of the minimization algorithm. When CLRB is used before the seeding process. the systems and methods described herein may be configured to utilize the last localization point or system of equations to determine the seeding point. In such a scenario, the systems and methods described herein may be configured to skip the seeding process.

The systems and methods described herein may be configured to perform a localization process. The localization process may be generally composed of minimization algorithms and/or utilizing a system of equations. A system of equations is preferred when input error is low and the selected set of sensors has a low condition number. As input estimation errors are not guaranteed, another process is used to utilize minimization algorithms. The concern with minimization algorithms is that the algorithm may get stuck in local minima leading to a suboptimal solution. To solve the issue of local minima there are two potential methods.

The systems and methods described herein may be configured to perform a global minimization calculation. The systems and methods described herein may further be configured to include various combinations of sensor sets. The systems and methods described herein determine a final localization point using MMSE (minimum mean square error), maximum likelihood, or clustering methods. All these process are computationally intensive. In many cases, the issue of local minima may be solved by choosing an appropriate seeding point and a good set of sensors. The set of sensors based on geometry and condition number as described above may be used to select a good set of sensors. For selecting seeding points, there are several possibilities, and based on the tag device setup, the one with the best localization performance may be chosen.

The systems and methods described herein may be configured to perform an origin seeding process utilizing the position of the vehicle as the origin of a coordinate system.

The systems and methods described herein may be configured to include a last localization point seeding process. The last estimated position of the tag device may be chosen as the starting seed for the next localization estimation.

The systems and methods described herein may be configured to perform a shortest-range reporting sensor seeding process. The coordinates of a sensor reporting the shortest range, smallest angle, and/or smallest TDoA may also be chosen as the starting point for the minimization algorithm.

The systems and methods described herein may be configured to perform a constrained sphere calculation (applicable for range-based methods). In the systems and methods described herein, once the range compensation is applied, the systems and methods described herein may be configured to calculate intersection points for each pair of intersecting circles. Each pair of sensors with intersecting range spheres will create an intersecting circle. The systems and methods described herein may be configured to perform nearest neighbor (k-NN) clustering, where clusters with the largest number of intersection points are determined and the centroid of that cluster is chosen as the starting point. Median, mean, mode, or other statistical computations of those cluster points may also be chosen as a solution. The distance to each sensor is calculated from this point. The systems and methods described herein may be configured to autocorrect the reported ranges for the sensors, where the new range difference is above a given threshold (e.g., 20 cm or 20%) before proceeding to minimization. Note that this may be one of the possibilities for parameter correction. In such a case, there is a benefit to utilizing all the sensors to determine the starting point. However, that benefit is at the expense of higher computational demands.

The systems and methods described herein may be configured to derive the equations of all the circles of intersection of the sphere pairs. The systems and methods described herein may be configured to solve for the intersection of the spheres pairwise in order to find the intersection points of the circles. Solving pairwise is done by iterating over the specified domain of t and considering the points that satisfy both circle equations under consideration. The systems and methods described herein may be configured to iterate through the values of t between [0, 2π] and take the resultant points that are common between any two parametric equations of the circle of intersecting spheres. These points form the set of all intersection points of the circle of intersections of spheres taken two at a time.

The systems and methods described herein may be configured to perform a 3D-Centroid localization calculation. Similar to the constrained sphere localization calculation, the systems and methods described herein may be configured to take a minimum of three chosen sensors. The systems and methods described herein may be configured to calculate the center of each intersecting circle. The systems and methods described herein may utilize a starting point which is the mean value of the coordinates of the center point of these intersecting circles. The systems and methods described herein may be configured to minimize the computational overhead of the constrained sphere localization calculation. When considering more than 3 sensors the systems and methods described herein may consider all of the chosen sensors in the set (normally 4) at once, leading to six intersection circles. The seeding point may be mean, median, mode, middle, and the like for those six centers of intersecting circles.

The systems and methods described herein may be configured to perform bounding box localization calculation. Similar to 3D-Centroid localization calculation, the systems and methods described herein may be configured to determine the cuboid which is common to all cuboids formed by enclosing the ranger spheres. The resulting solution is the center of the cuboid.

The systems and methods described herein may perform theoretically calculated (applicable for range base methods) localization calculations. In cases where the chosen sensor set has a good condition number (e.g. <5), the starting point may be calculated by the system of equations. In cases where the preferred sensor group is used, the matrix inversion may be pre-computed thereby reducing the run-time computation substantially.

For 3D-centroid and Bounding box localization calculations, the systems and methods described herein may also perform a weighted average calculation of the selected bounding points (centers of intersecting circles for 3D-Centroid and coordinates of common cuboid for bounding box methods). The systems and methods described herein may be configured to perform at least two ways to calculate the weights-based distance of the seed point from the sensors. The two possibilities are shown below:

$$w_j = \frac{1}{\sum_{j=1}^{8} |D_{nj} - d_n|}$$

$$w_j = \frac{1}{\sqrt{\sum_{j=1}^{8} |D_{nj} - d_n|^2}}$$

$w_j \to$ Weight for bounding point $P_j$ $D_{nj} \to$ Distance of anchor 'n' from bounding point $P_j$ $d_n \to$ Reported range of anchor 'n'

For the systems and methods described herein, when MSE for the seeding point is less than a pre-determined threshold (i.e., 1 cm), the calculated point may be declared as the possible solution, and there is no need to perform minimization. At the same time for theoretical localization calculation, several computations may be done and stored in advance for faster run-time computation.

The systems and methods described herein may perform Cramer-Rao Lower Bound (CRLB) localization calculation after the seeding process to finalize the set of sensors for the minimization algorithm. A difference emerges is in a scenario where the systems and methods described herein may be configured to utilize the CRLB method in the localization process, where parameter estimation correction in the data pre-processing process may be done for all sensors. For minimization, the systems and methods described herein may utilize any gradient-based algorithms such as gradient descent, limited memory Broyden-Fletcher-Goldfarb-Shanno (L-BFGS), Levenberg-Marquardt (LMA), and the like.

The systems and methods described herein may be configured to perform a heuristics process. Even with all corrections and pre-processing, the systems and methods described herein may produce an inaccurate localization position estimate for the tag device. The systems and methods described herein may be configured to apply sanity checks for the estimated position. Particularly, when the estimated position is around the boundary of interest for the tag device area. For example, such a boundary of interest could be defined by the car's boundary. Localization position could determine whether the tag device is inside or outside the car (which in turn will determine whether the car ignition is free to be turned on or not). Such a boundary may also be a perimeter boundary around the car where access to the car is allowed only when the tag device is within that boundary. The boundary may be defined by zones in and around the vehicle, where knowing the position of the tag device in the zone may help provide user experience and safety features. For example, when turning on the blinker from the side where the driver is approaching, unlocking only the door where the driver is approaching/standing, or giving a warning message if the tag device is identified in a given zone. Similarly, a virtual boundary in an area of interest for home and/or building environments may be used for access control, object and/or asset tracking, and personalized services such as lighting control, and the like.

The systems and methods described herein may be configured to perform a range-based decision for localization. When the localization point is estimated to be outside of the range estimated by the interior sensor, the inside and/or outside decision should be based on this input. The systems and methods described herein may be configured to utilize localization estimates to give an idea of where the tag device may be. The systems and methods described herein may utilize several sensors which may be used to create a zonal area. The range estimates may be used to provide a yes or no decision regarding whether the tag device is within the zonal area. The systems and methods described herein may be configured with several sensors that have the same or equal weights which may be used to make a decision. Further, a majority vote could be another way, in a case where not all sensors lead to the same decision.

The systems and methods described herein may be configured to perform a signal quality-based decision. Power levels of received signals or signal quality may also be used to make a decision whether the tag device is within the area of interest or not. This is true when the car's area of interest is separated by a process that may affect the signal quality. For example, the power level and/or signal quality of the received signal at an in-car sensor may be used to determine if the tag device is within the car or not. A sensor receiving a signal next to a thick wooden or metallic door may determine from which side of the door the signal is coming (or whether the tag device is present). Several sensors, with the same or equal weights, may be used to make a decision. A majority vote could be another way to resolve a scenario where not all the sensors lead to the same decision.

The systems and methods described herein may be configured to include fingerprinting location of interest. Ambiguous scenarios (e.g., around the zone boundaries or unique locations such as a console, a map, pockets, and the like) may also be determined using RF (radio frequency) fingerprinting techniques. The systems and methods described herein may be configured to determine ambiguous locations in or around an area of interest. After the systems and methods described herein have determined a localization point is near an area of interest, the other signal properties (such as channel state data from all sensors or top 4 sensors as described above) to determine the location of the tag device from the given set of fingerprinted locations utilizing signal processing or machine learning. In such cases, fingerprint data for the area of interest is already collected and stored. An alternative may be to determine the fingerprint based on the ranges of a particular point on the car. In this case, fingerprint data for the area of interest is already pre-computed, and based on estimated ranges from sensors in a given round, a final localization point is determined. During pre-computation of ranges, the systems and methods described herein may also take into account channel errors (e.g., as Random Gaussian) and accordingly add to the pre-computed ranges for the given points within the area of interest.

The systems and methods described herein may include some possible combinations of range and signal quality-based methods to determine the inside and/or outside zones. Values from multiple sensors may be used to create specialized zones of interest. Once a zone is determined, RF fingerprinting may also be used to calculate the location.

For the systems and methods described herein, the localization process may be optional. In scenarios where a localization process may be used, a Kalman filter may also be used on the localization output. When the tag device is within the enclosed area of the sensors it produces a positive user experience.

The systems and methods described herein may be configured to perform multiple minimization rounds with different seeds and/or different sensor groups. The localization estimate may be obtained using clustering, majority voting, or statistical methods (i.e., mean, median, middle, mode, and the like). When hardware is available with multiple processing cores, these minimization calculations may be performed in parallel.

The systems and methods described herein may be configured to perform a sensor selection process that chooses all pre-determined sensors. The systems and methods described herein may be configured to calculate the localization using the theoretical system of equations (the processing may be faster if matrix inversions for those sensor groups are pre-computed and stored). The seeding point may be obtained using clustering, majority voting, or statistical methods (e.g., mean, median, middle, more, or the like), of those calculated possible points. The systems and methods described herein may be configured to utilize minimization algorithms and CRLB when MSE (mean square error) of the input seed is more than a pre-determined threshold (e.g. 1 cm).

The systems and methods described herein may be configured to include a system for localizing a signal. The system and methods described herein may be configured to include a processor and a memory. The memory includes instructions that, when executed by the processor, cause the processor to receive, for each sensor of a plurality of sensors, one or more localization values indicating an estimated distance between a tag device and a respective sensor of the plurality of sensors. The system and methods described herein may be configured to further identify a first sensor of the plurality of sensors having a localization value that is less than localization values associated with each other sensor of the plurality of sensors. The system and methods described herein may be configured to identify, based on the first sensor and a geometric relationship between the first sensor and the plurality of sensors, a subset of sensors of the plurality of sensors. The system and methods described herein may be configured to calculate an estimated location of the tag device relative to the subset of sensors based on one or more distances between the first sensor and at least two other sensors of the subset of sensors.

The systems and methods described herein include, in response to determining that a threshold number of consecutive localization values from a respective sensor of the plurality of sensors have a zero value, disregarding localization values from the respective sensor.

The systems and methods described herein include applying triangle inequality theorem to the localization values of each sensor of the plurality of sensors; and identifying, in response to applying the triangle inequality theorem to the localization values of each sensor of the plurality of sensors, localization values that are impossible based on one or more relative positions of the plurality of sensors.

The systems and methods described herein include multiplying identified impossible localization values by a compensation factor.

The systems and methods described herein include determining a Cramer-Rao Lower Bound score for the localization values of the plurality of sensors; and ranking the plurality of sensors based on the respective Cramer-Rao Lower Bound score.

The systems and methods described herein include calculating the estimated location of the tag device by applying a gradient descent algorithm to the localization values received from the subset of sensors.

The systems and methods described herein include determining whether the estimated location of the tag device is in an area of interest having a prestored radio frequency fingerprinting datum, and updating the estimated location of the tag device based on comparing a received radio frequency signal with the prestored radio frequency fingerprinting datum.

The systems and methods described herein include receiving a command from the tag device; and executing an action based on the command, the estimated location of the tag device, and a location of a sensor of the plurality of sensors.

The systems and methods described herein include, in response to a determination of signal quality, applying a localization factor to the localization values of each sensor of the plurality of sensors. The localization factor may be calculated using classification and/or regression models over signal quality parameters to reduce and/or minimize the error in localization values.

The systems and methods described herein include applying a constrained sphere calculation to the localization values of each sensor of the plurality of sensors The systems and methods described herein include determining which subset of sensors sharing a geometric relationship reports the shortest average distance between the subset of sensors and the tag device.

The systems and methods described herein include, applying a bias compensation value to the localization values reported by each sensor of the subset of sensors, the bias compensation factor being calculated based on a mean error reported by the sensor, of the subset of sensors, reporting the shortest distance from the tag device. The mean error may include a signed mean error, absolute mean error, or root mean square error of the error distribution.

The systems and methods described herein may be configured to include localizing a signal. The systems and methods described herein may be configured to include a processor and a memory. The system and methods described herein may include memory which includes instructions that, when executed by the processor, cause the processor to receive, for each sensor of a plurality of sensors, one or more localization values indicating an estimated distance between a tag device and a respective sensor of the plurality of sensors. The systems and methods described herein identify a first sensor of the plurality of sensors having a localization value that is less than localization values associated with each other sensor of the plurality of sensors. The systems and methods described herein identify, based on the first sensor and a geometric relationship between the first sensor and the plurality of sensors, a subset of sensors of the plurality of sensors. The systems and methods described herein calculate an estimated location of the tag device relative to the subset of sensors based on one or more distances between the first sensor and at least two other sensors of the subset of sensors. The systems and methods described herein, in response to determining that a threshold number of consecutive localization values from a respective sensor of the plurality of sensors have an invalid value, disregarding localization values from the respective sensor. The systems and methods described herein determine whether the estimated location of the tag device is in an area of interest having a prestored radio frequency fingerprinting datum. The systems and methods described herein also update the estimated location of the tag device based on comparing a received radio frequency signal with the prestored radio frequency fingerprinting datum.

Figure 1:
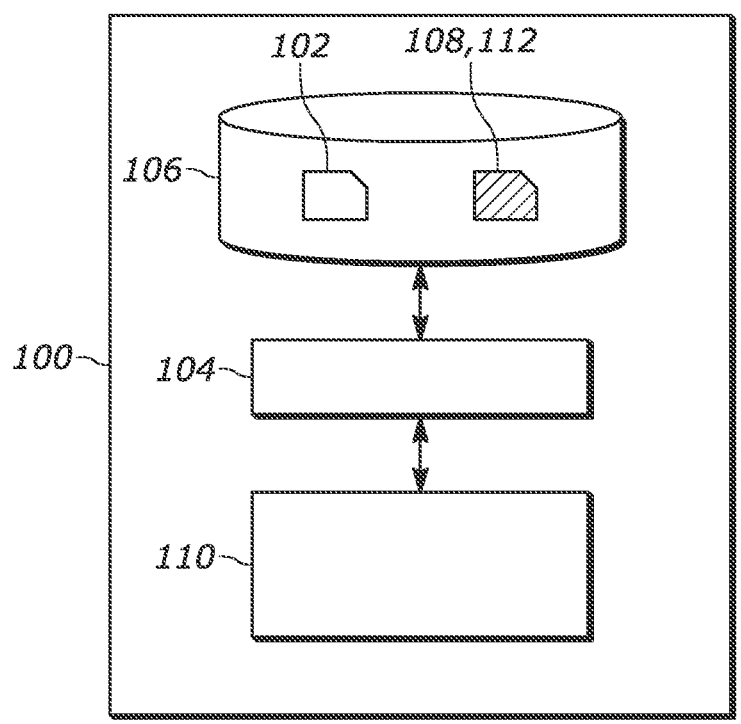
FIG. 1 generally illustrates a system for training a neural network, according to the principles of the present disclosure.

FIG. 1 shows a system 100 for training a neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, ultra-wideband (UWB), Zigbee, Matter or Wi-Fi interface or an automotive bus such as CAN, FlexRay, MOST or coaxial interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104.

In some embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers.

The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus the input of the processor subsystem 110, and by providing the equilibrium point as a substitute for an output of the stack of layers in the neural network.

The system 100 may further comprise an output interface for outputting a data representation of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyper parameters and other types of parameters of neural networks, may be adapted to reflect the training on the training data 102. This is also illustrated in FIG. 1 by the reference numerals 108, 112 referring to the same data record on the data storage 106. In some embodiments, the data representation 112 may be stored separately from the data representation 108 defining the 'untrained' neural network. In some embodiments, the output interface may be separate from the data storage interface 104, but may in general be of a type as described above for the data storage interface 104.

In some embodiments, the system 100 may include a plurality of sensors with wireless radio. Additionally, or alternatively, the system 100 (e.g., including the plurality of sensors and the wireless radio) may be comprise one single system-on-chip (SoC) or could have wireless radio connected with system 100. Additionally, or alternatively, to power the sensors, the system 100 may include a battery module or may use line power using an AC or DC source. The wireless radio may be used to communicate with the tag device and collect the wireless signal quality parameters during the communication. The wireless radio may employ UWB technologies that provide channel state information as channel impulse response consisting of received energy at given time intervals which allows to determine direct path, reflected path of signals, time-of-arrival of signal, received power and propagation time for each reflected path among various received signal quality characteristics. UWB technologies provide improved timing granularity and performance, and are therefore more accurate to determine distance between the communicating devices. When accuracy is not a primary concern several narrow band technologies such as Bluetooth low energy or Wi-Fi or 802.15.4 based solutions such as ZigBee, Matter or cellular technologies (e.g., 3G, 4G, 5G, 6G) or other proprietary solutions can also be employed. With Wi-fi, several frequency channels can be 'bonded' together to get a relatively large bandwidth. However, for these narrow-band solutions the primary signal quality source is channel state information denoted by channel frequency response, which includes amplitude and phase of the received signal for each frequency sub-carrier or whole frequency channel (e.g., when there is only one sub-carrier). The channel state information may be utilized to determine angle of received signal (e.g., when multiple antennas are available), direct vs reflected path, received signal strength and time of arrival among others. The system 100 may use the wireless radio to communicate with other sensors or main system as described in FIG. 2 or could use additional communication method or technique. For the latter case, the system 100 may include another communication module connected to the wireless radio. The communication module may use the same technology as supported by network interface 222.

Figure 2:
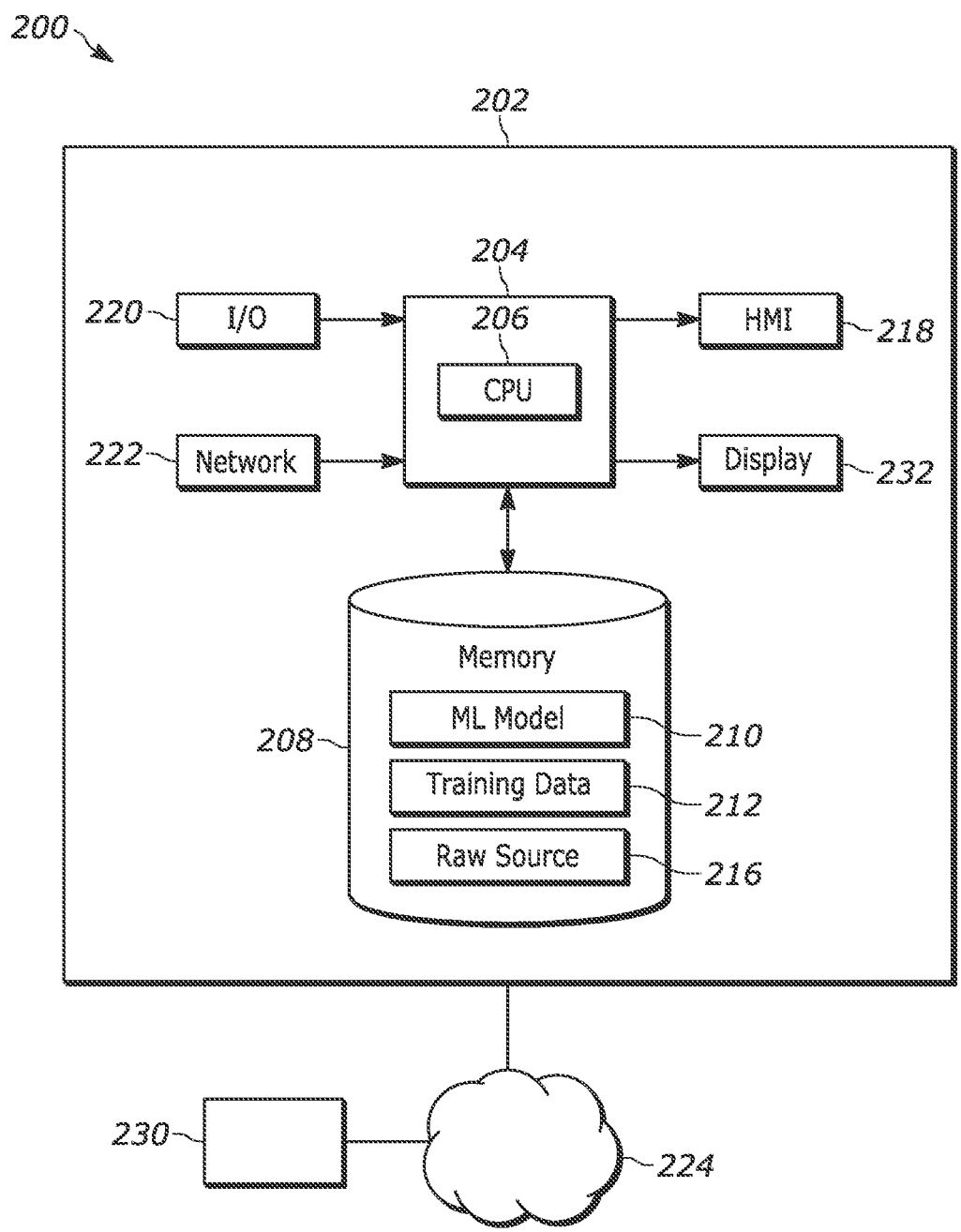
FIG. 2 generally illustrates a computer-implemented method for training and utilizing a neural network, according to the principles of the present disclosure.

FIG. 2 depicts a sensor localization system 200 to implement a system for localizing sensors relative to a tag device. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction step such as one of the x86, ARM, Power, or MIPS instruction set families.

During operation, the CPU 206 may execute stored program instructions that are retrieved from the memory unit 208. The stored program instructions may include software that controls operation of the CPU 206 to perform the operation described herein. In some embodiments, the processor 204 may be a system on a chip (SoC) that integrates functionality of the CPU 206, the memory unit 208, a network interface, and input/output interfaces into a single integrated device. The computing system may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216.

The computing system 202 may include a network interface device 222 that is configured to provide communication with external systems and devices. For example, the network interface device may include a wired and/or wireless Ethernet interface as defined by Institute of Electrical and Electronics Engineers (IEEE) 802.11 family of standards. The network may include a standard wired controller area network (CAN). The network interface device 222 may include a cellular communication interface for communicating with a cellular network (e.g., 3G, 4G, 5G, 6G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors. In some embodiments, the system 200 may comprise a signal electronic control unit of the vehicle or multiple electronic control units of the vehicle. Additionally, or alternatively, the system 200 may comprise an electronic control unit configured to connect one or more sub-systems (e.g., such as a keyless entry sub-system) with one or more other sub-systems. Additionally, or alternatively, the system 200 may comprise an electronic control unit of the keyless entry sub-system or other suitable sub-system of the vehicle.

The system 200 may implement a machine-learning algorithm 210 that is configured to analyze the raw source dataset 216. The raw source dataset 216 may include raw or unprocessed signal quality data that may be representative of an input dataset for a machine-learning system. The raw source dataset 216 may further include video, video segments, images, text-based information, and raw or partially processed sensor data (e.g., radar map of objects) for sensor fusion. In some embodiments, the machine-learning algorithm 210 may be a neural network algorithm that is designed to perform a predetermined function. For example, the neural network algorithm may be configured to determine zone and/or location of the tag based on sensor quality data and/or estimated tag range from the sensors. The neural network may also be used to determine localization factor for estimated ranges based on signal quality of such estimations.

The system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include signal quality values and/or estimated ranges and corresponding pre-determined locations of interest/zones. The data may include scenarios under different parking conditions such as in open parking, closed parking, garage, and/or the like.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., annotations) with those included in the training dataset 212. Since the training dataset 212 includes the expected results, the machine-learning algorithm 210 can determine when performance is acceptable. After the machine-learning algorithm achieves a predetermined performance level (e.g., 100% agreement with the outcomes associated with the training dataset 212), the machine-learning algorithm 210 may be executed using data that is not in the training dataset 212. The trained machine-learning algorithm 210 may be applied to new datasets to generate annotated data.

The machine-learning algorithm 210 may be configured to identify a particular feature in the raw source data 216. The raw source data 216 may include a plurality of instances or input dataset for which annotation results are desired. For example, the machine-learning algorithm 210 may be configured to determine the localization factor for estimated range based on signal quality. The machine-learning algorithm 210 may be programmed to process the raw source data 216 to identify the presence of the particular features. The machine-learning algorithm 210 may be configured to identify a feature in the raw source data 216 as a predetermined feature (e.g., estimated range from sensors for determinizing location of interest/zone). The raw source data 216 may be derived from a variety of sources. For example, the raw source data 216 may be actual input data collected by a machine-learning system. The raw source data 216 may be machine generated for testing the system. As an example, the raw source data 216 may include estimated range, measure range (ground truth), signal quality parameters and other semantics (e.g. location, environment).

In the example, the machine-learning algorithm 210 may process raw source data 216 and output an indication of a location of interest and/or localization factor. The output may also include augmented representation of the signal quality parameters. A machine-learning algorithm 210 may generate a confidence level or factor for each output generated. For example, a confidence value that exceeds a predetermined high-confidence threshold may indicate that the machine-learning algorithm is confident that the identified feature corresponds to the particular feature. A confidence value that is less than a low-confidence threshold may indicate that the machine-learning algorithm 210 has some uncertainty that the particular feature is present.

FIG. 3 is a block diagram illustrating a high-level overview of the tag device localization process 300. At 302, the process 300 receives from a plurality of sensors a localization value from each sensor. For example, a vehicle having multiple sensors placed on multiple points on the vehicle will report a localization value from each of those multiple sensors. The sensors' localization values are an estimated distance between each sensor and a tag device. A tag device may be a smartphone, a smartwatch, augmented reality goggles, a personal digital assistant, a laptop, or any appropriate device.

At 304, the process 300 identifies a first sensor of the plurality of sensors based on its localization value. The localization value of each sensor is compared and ranked. The sensor with the shortest distance is designated as the first sensor. At 306, the process 300 identifies a subset of the plurality of sensors based on the first sensor and a geometric relationship with the remaining sensors. Geometric conditioning assists in excluding sensors exhibiting collinearity and/or co-planarity that negatively impacts the accuracy of the minimization algorithm. Sensor groups with symmetrical geometry should be chosen. Sensors in a straight line should be avoided.

At 308, the process 300 calculates an estimated localization value of the tag device in relation to the vehicle, based on the subset of sensor including the first sensor. The process continues updating the estimated location of the tag device over time. Each new iteration of the location estimation by the process 300 updates the estimated location based on the most recent localization value of the sensors. As the tag device moves in relation to the vehicle, the first sensor from the plurality of sensors will change. The subset of sensors including the first sensor will likewise change.

Figure 4:
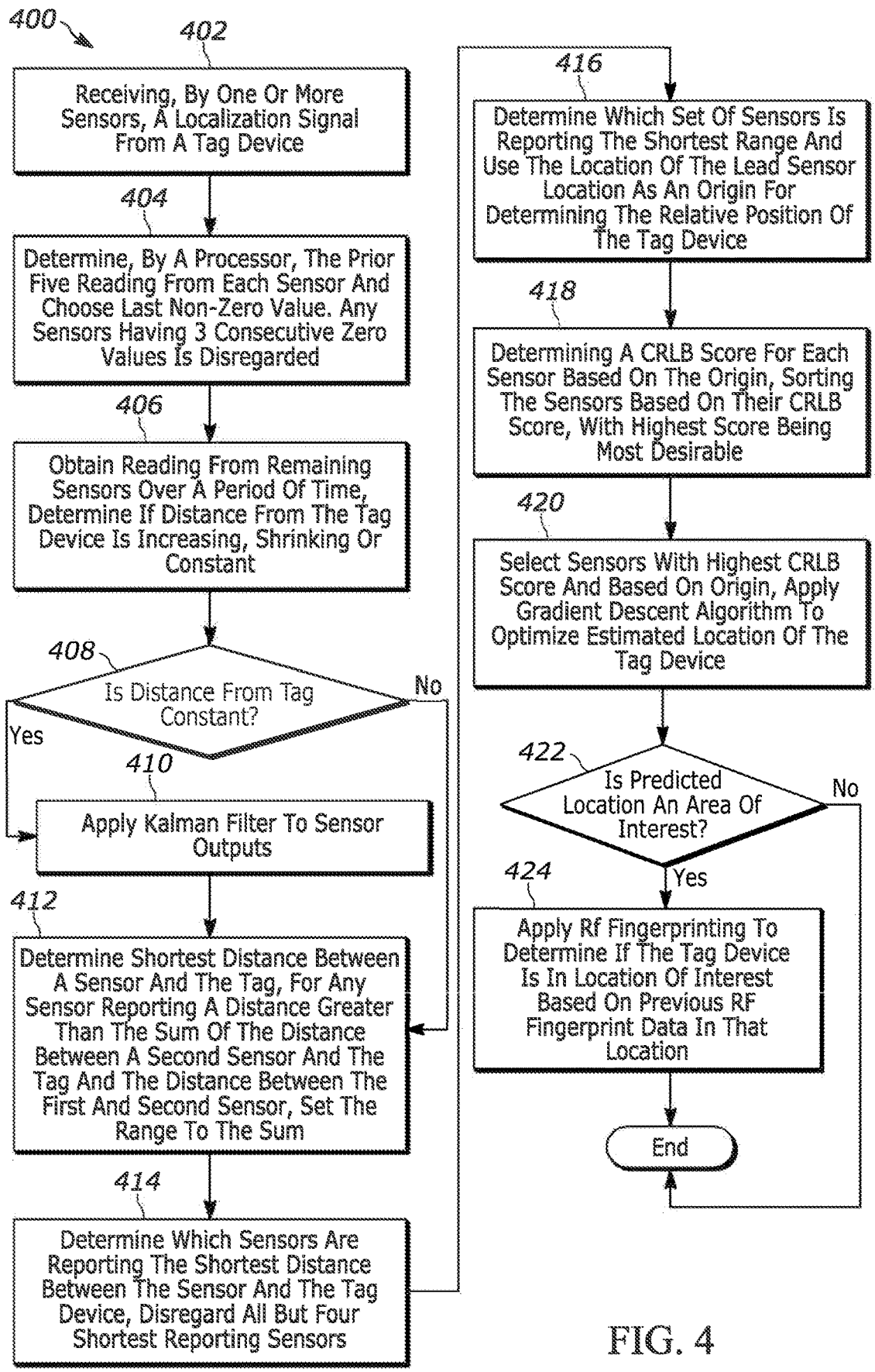
FIG. 4 is a flow chart that illustrates in greater detail the process for calculating a location of a tag device, according to the principles of the present disclosure.

FIG. 4 is a block diagram generally illustrating the process for calculating the location of a tag device in relation to a location having a plurality of sensors. At 402, the process 400 receives from one or more sensors a localization value indicating the distance between each individual sensor and the tag device. At 404, the process 400 looks at five consecutive localization values output by each sensor. The process 400 determines whether, among the five consecutive localization values, there are three consecutive zero values. All sensors reporting three consecutive zero values among the most recent five localization values received from the sensors, are disregarded. The identified sensors having more than three consecutive zero values remain disregarded until the values received are no longer consecutive zero values or the location of the tag device has moved in relation to the location having the sensors.

At 406, the process 400 obtains localization values from the remaining sensors over time. A filter (such as a Kalman filter) may sometimes be applied to each sensor to reduce error. The process determines when to apply the filter based on the estimated movement of the tag device in relation to the location having the sensors. For example, when the sensors are on a vehicle and determine that, over time, the location of the tag device in relation to the vehicle is nearly stationary (i.e., absolute difference less than pre-determined threshold such as 10 cm), the process 400 will apply a filter to each sensor. When, instead, the sensors on the vehicle determine that the location of the tag device is changing over time (i.e., absolute difference more than pre-determined threshold), the process 400 does not apply filters to the sensors. At 408, the process 400 determines whether the tag device is moving or not in relation to the location having the sensors. If the sensors at 408 indicate that the tag device is not moving in relation to the location having the sensors than the process 400 moves on to step 410, otherwise, the process 400 moves on to step 412.

At 410, the process 400 applies a filter to the plurality of sensors associated with a location. At 412, the process 400 applies the triangle inequality theorem to the localization values provided by the sensors to correct for erroneous readings. The process 400 determines the shortest distance between a sensor and the tag device. For any sensor reporting a distance greater than the sum of the distance between another sensor and the tag device, set the value of the sensor to the sum of the distanced between the other sensor and the tag device. Any sensors providing readings that are impossible based on the triangle inequality theorem will be reduced to the theoretical maximum allowed by the triangle inequality theorem.

At 414, the process 400 determines which sensors are reporting the shortest distance between the sensor and the tag device. The process 400 chooses a subset of the plurality of sensors based on which are reporting the shortest distance. The process 400 chooses a predetermined number of sensors for the subset (i.e., three to five sensors). At 416, the process 400 determines which subset of sensors are reporting the shortest range and estimates the location of the tag device with the origin of the calculation being the sensor reporting the shortest distance.

At 418, the process 400 determines a Cramer-Rao Lower Bound (CRLB) score for each sensor of the subset of sensors. The systems and methods described herein may be configured to include Cramer-Rao Lower Bound (CRLB) based localization calculation of selecting sensors for providing an input to the minimization algorithm. CLRB integrates the effects of relative geometry of the calculated seeding point (best estimate of the initial location of the tag device) and the sensors which responded in the particular ranging round. The sensors are ranked based on their CRLB score, with a higher score being more highly ranked.

At 420, the process 400 selects a subset of the plurality of sensors based on the CLRB score rankings and calculates an estimated location of the tag device based on the localization values received from the subset of sensors. The process 400 applies a gradient descent algorithm to optimize the localization calculation of the tag device. Based on the estimated position of the tag device, the process 400 determines if the tag device is in a pre-determined are of interest. For example, where the location associated with the sensors is a vehicle than the pre-determined area of interest may be the glove compartment of the vehicle or any common position for the tag device to be located. Locations that are common for the tag device will have a pre-stored radio frequency fingerprint associated therewith. The tag device being in the same area should recreate the same radio frequency fingerprint.

At 422, the process 400 determines whether or not the tag device is in one of the predetermined locations. If the tag device is determined to be in a predetermined location, the process 400 moves on to 424. At 424, the process 400 applies radiofrequency fingerprinting to verify the location of the tag device. Radio frequency fingerprinting compares the current radio frequency fingerprinting of the tag device and compares it with the pre stored record of the tag device when it was in the same location. If the fingerprints are identical then the location of the tag device is authenticated.

Figure 5:
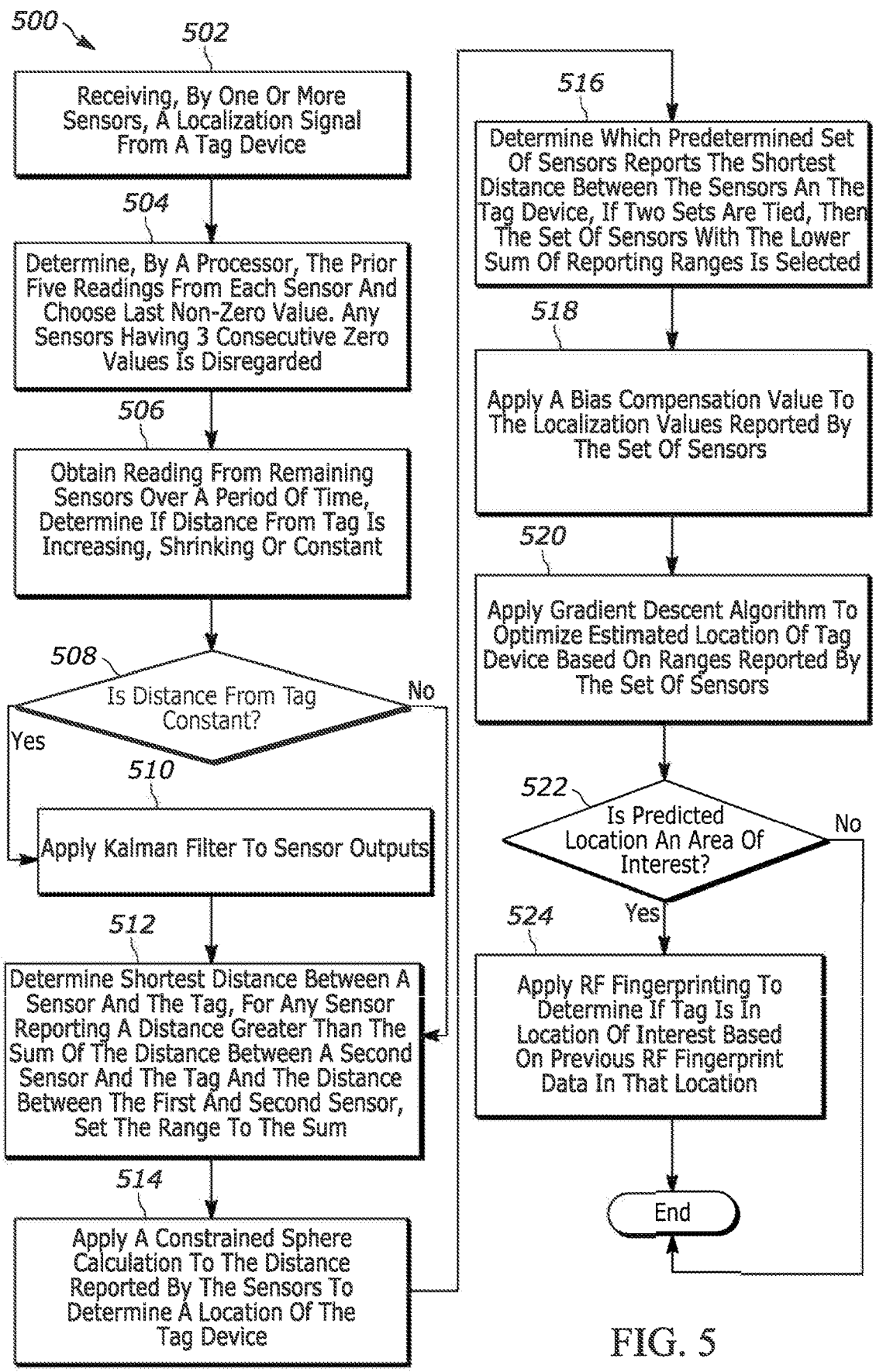
FIG. 5 is a flow chart that illustrates in detail an alternative process for calculating a location of a tag device, according to the principles of the present disclosure.

FIG. 5 is a block diagram generally illustrating the process for calculating the location of a tag device in relation to a location having a plurality of sensors. At 502, the process 500 receives from one or more sensors a localization value indicating the distance between each individual sensor and the tag device. At 504, the process 500 looks at five consecutive localization values output by each sensor. The process 500 determines whether, among the five consecutive localization values, there are three consecutive zero values. All sensors reporting three consecutive zero values among the most recent five localization values received from the sensors, are disregarded. The identified sensors having more than three consecutive zero values remain disregarded until the values received are no longer consecutive zero values or the location of the tag device has moved in relation to the location having the sensors.

At 506, the process 500 obtains localization values from the remaining sensors over time. A filter (such as a Kalman filter) may sometimes be applied to each sensor to reduce error. The process determines when to apply the filter based on the estimated movement of the tag device in relation to the location having the sensors. For example, when the sensors are on a vehicle and determine that, over time, the location of the tag device in relation to the vehicle is nearly stationary (i.e., absolute difference less than pre-determined threshold such as 10 cm), the process 500 will apply a filter to each sensor. When, instead, the sensors on the vehicle determine that the location of the tag device is changing over time (i.e., absolute difference more than pre-determined threshold), the process 500 does not apply filters to the sensors. At 508, the process 500 determines whether the tag device is moving or not in relation to the location having the sensors. If the sensors at 408 indicate that the tag device is not moving in relation to the location having the sensors than the process 500 moves on to step 510, otherwise, the process 500 moves on to step 512.

At 510, the process 500 applies a filter to the plurality of sensors associated with a location. It should be understood that steps 512, 514, and 518 are optional for the operation of the invention as a whole. An administrator may integrate steps 512, 514, and 518 as required, on a case by case basis. At 512, the process 500 applies the triangle inequality theorem to the localization values provided by the sensors to correct for erroneous readings. The process 500 determines the shortest distance between a sensor and the tag device. For any sensor reporting a distance greater than the sum of the distance between another sensor and the tag device, set the value of the sensor to the sum of the distanced between the other sensor and the tag device. Any sensors providing readings that are impossible based on the triangle inequality theorem will be reduced to the theoretical maximum allowed by the triangle inequality theorem.

At 514, the process 500 applies a constrained sphere calculation to the localization values reported by the sensors. At 516, the process 500 determines which subset of sensors are reporting the shortest range and estimates the location of the tag device with the origin of the calculation being the sensor reporting the shortest distance. If there is a tie between two sets of sensors, the set of sensors having the lower sum of localization values is selected.

At 518, the process 500 applies a bias compensation value to the localization values reported by the set of sensors, where the error distribution may be based on a specific sensor or a specific order in the set based on the shortest range (e.g., distribution of errors for shortest reporting sensors, second shortest reporting sensors, and the like). The above may be combined to affect both the mean and standard deviation of reported errors. Additionally, or alternatively, a compensation factor can be calculated by the selecting a factor that minimizes the overall mean error of the error distribution. This mean error may include a signed mean error, absolute mean error, or root mean square error of the error distribution. Further, error distributions can be produced for the whole data or specific categories based on range, power values, LOS/NLOS, per sensor or sensor order as mentioned earlier to obtain respective compensation factors and/or mean errors. Alternately, the bias compensation value can be calculated individually for each received localization value denoted by localization factor. The process may include, in response to a determination of signal quality, applying a localization factor to the localization values of each sensor of the plurality of sensors. The localization factor being calculated using classification and/or regression models over signal quality parameters to minimize the error in localization values.

At 520, the process 500 applies a gradient descent algorithm to optimize the localization calculation of the tag device. Based on the estimated position of the tag device, the process 500 determines if the tag device is in a predetermined are of interest. For example, where the location associated with the sensors is a vehicle than the pre-determined area of interest may be the glove compartment of the vehicle or any common position for the tag device to be located. Locations that are common for the tag device will have a pre-stored radio frequency fingerprint associated therewith. The tag device being in the same area should recreate the same radio frequency fingerprint.

At 522, the process 500 determines whether or not the tag device is in one of the predetermined locations. If the tag device is determined to be in a predetermined location, the process 500 moves on to 524. At 524, the process 500 applies radiofrequency fingerprinting to verify the location of the tag device. Radio frequency fingerprinting compares the current radio frequency fingerprinting of the tag device and compares it with the pre stored record of the tag device when it was in the same location. If the fingerprints are identical then the location of the tag device is authenticated.

Figure 6:
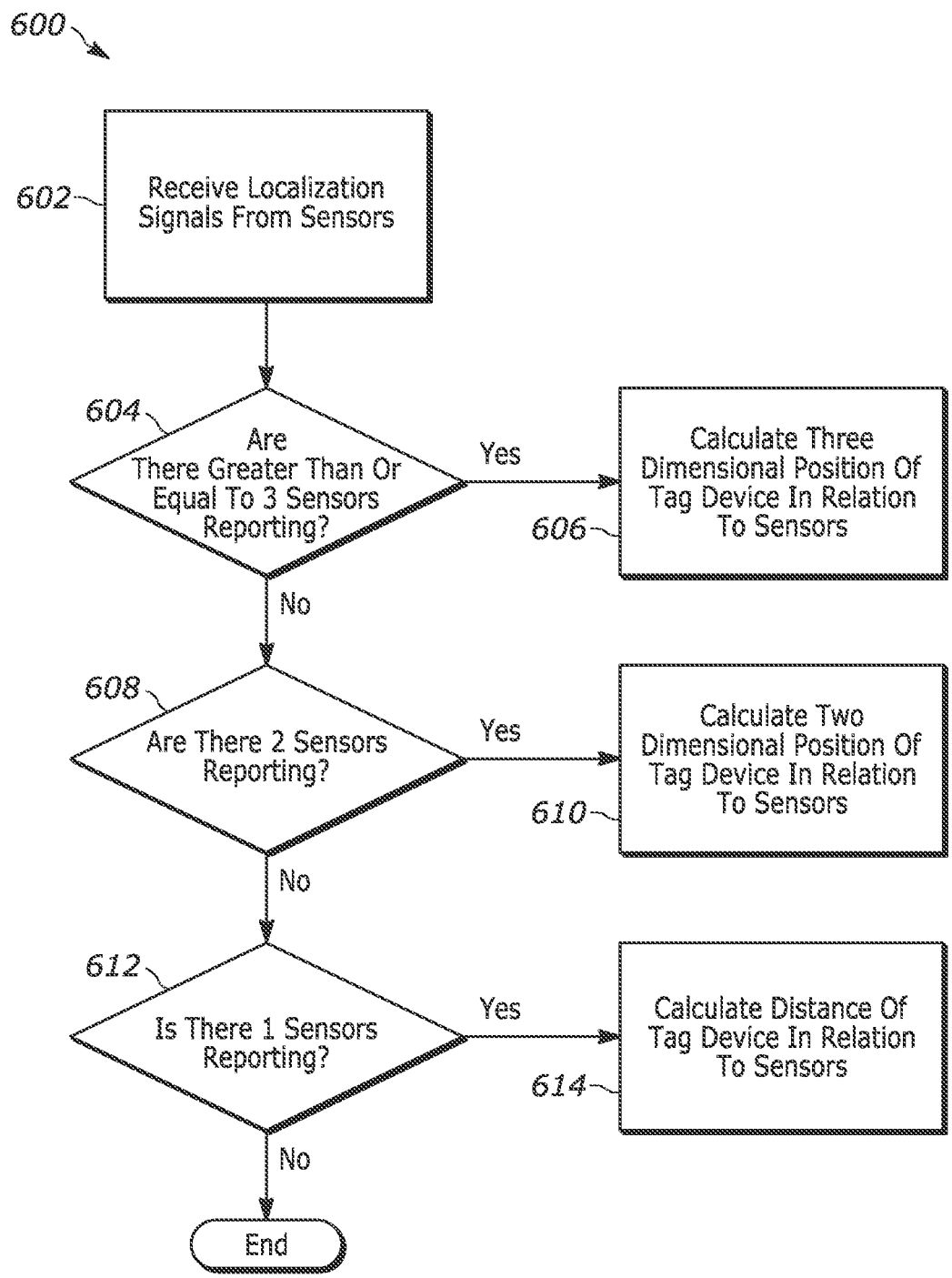
FIG. 6 is a flow chart that generally illustrates how to determine the type of localization calculation to perform, according to the principles of the present disclosure.

FIG. 6 is a block diagram illustrating the process of determining which type of location calculation is possible based on the inputs received. At 602, the process 600 receives localization signals from sensors associated with a location. At 604, the process 600 determines if the number of sensors reporting is greater than or equal to three. If there are greater than or equal to three sensors available, at 606, the process 600 determines that a calculation of the location of the tag device in relation to the sensors can be made in 3D.

At 608, the process 600 determines if the number of sensors reporting is greater than or equal to two. If there are two sensors available, at 610, the process 600 determines that a calculation of the location of the tag device in relation to the sensors can be made in 2D. At 612, the process 600 determines if the number of sensors reporting is one. If there is at least one sensor available, at 614, the process 600 determines that a calculation of the location of the tag device in relation to the sensors can only be made as a distance between the tag device and the sensor.

Figure 7:
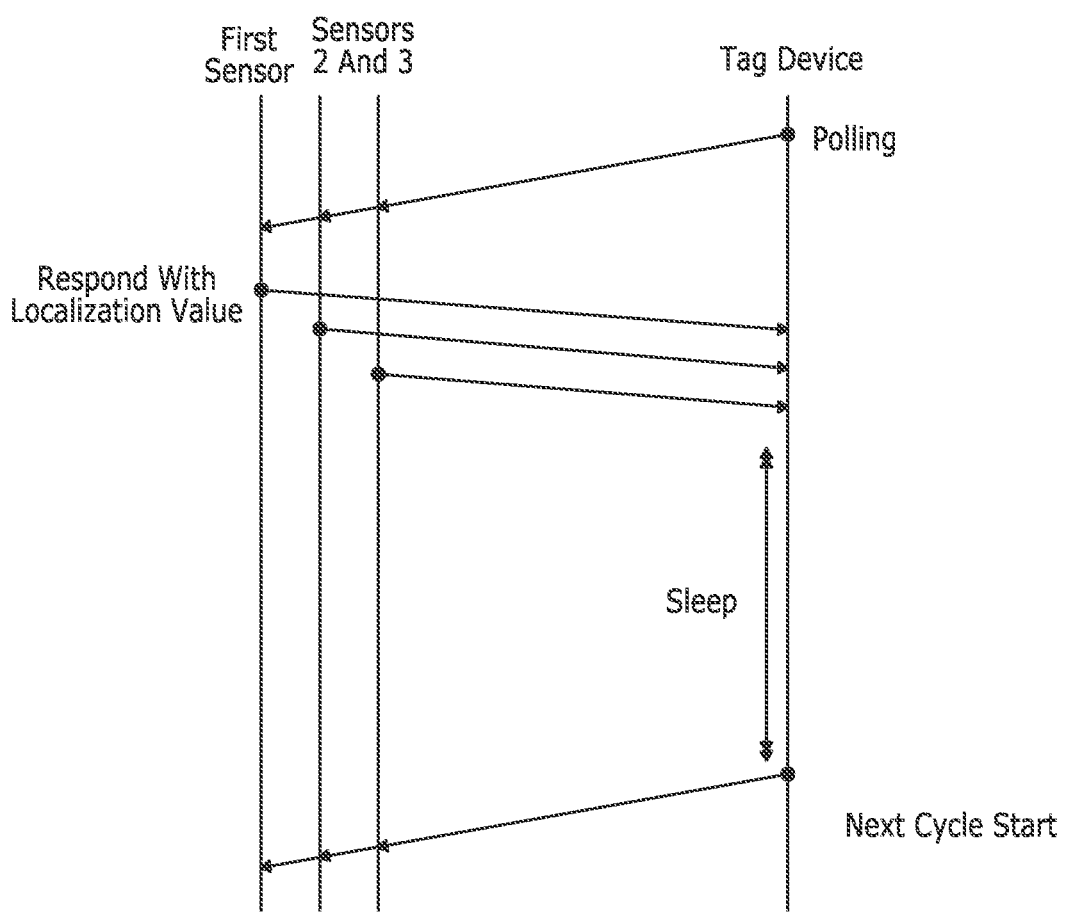
FIG. 7 is a line diagram generally illustrating the communication procedure between the sensor and the tag device, according to the principles of the present disclosure.

FIG. 7 is a line diagram generally illustrating the process of communication between the sensors and the tag device. When the tag device polls the sensors, the polling request is sent to all the available sensors. Each sensor, in turn, response back to the tag device based on the polling request. The second and third sensor may report back the received metadata to the first sensor. The first sensor may communicate with the plurality of sensors to create a subset of sensors, which may include itself. Alternatively, the tag device may only poll the first sensor which then polls the plurality of remaining sensors.

Figure 8:
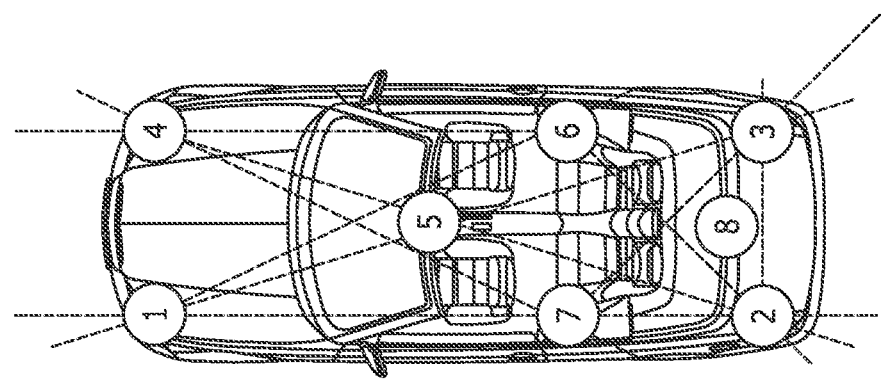
FIG. 8 generally illustrates the geometric-based anchor selection methodology, according to the principles of the present disclosure.
Figure 8:
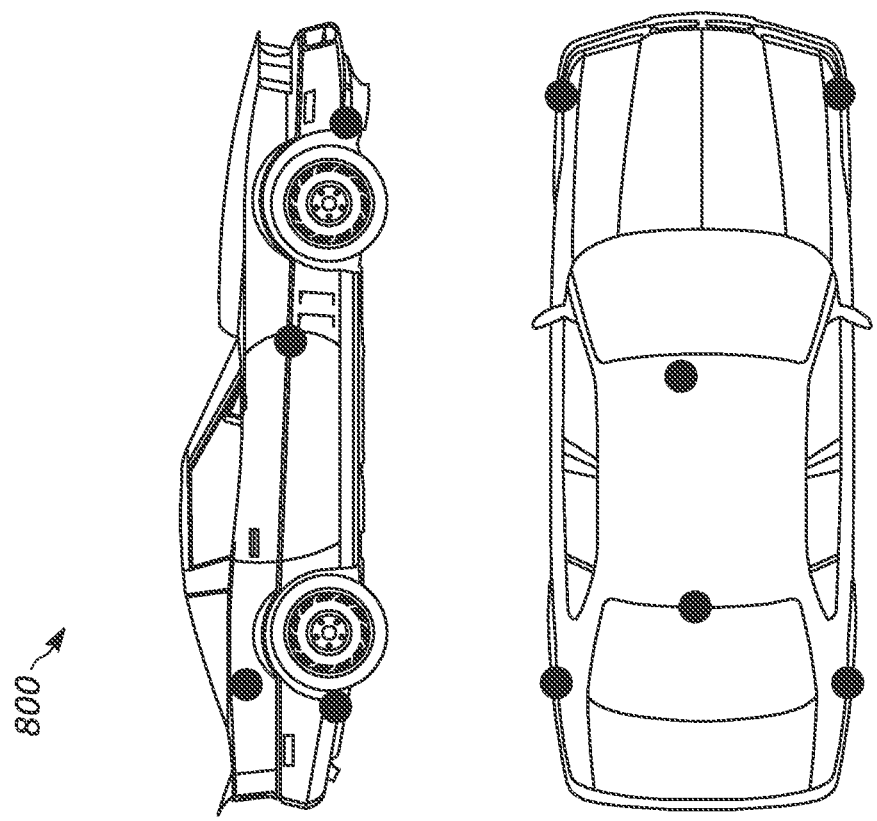

FIG. 8 generally illustrates the geometric-based anchor selection methodology, used to determine a subset of sensors of the plurality of sensors. Selecting a subset of sensors from the plurality of sensors is based on the symmetry of their locations. Balanced installation topology provides more stable localization compared to unbalance ones such as half or more anchors used for localization in the same plane. A sensor group having two sensors in one place may lead to the localization calculation getting stuck in local minima. Subsets of sensors may be chosen based on symmetrical geometry. For example, the sensors in FIG. 8 are labeled 1-8, and an ideal subset of sensors may be 1, 2, 3, and 4 based on their different locations and their forming of a rectangular shape. Another possible subset of geometrically aligned anchors is {1, 4, 6, 7} as well as {2, 3, 6, 7} and {5, 6, 7, 8}.

Any subset of sensors for whom most or all of the sensors may form a straight line or nearly a straight line should be avoided. An example of an undesirable subset of sensors may include 1, 7, and as well as 4, 6, and 3.

Figure 9:
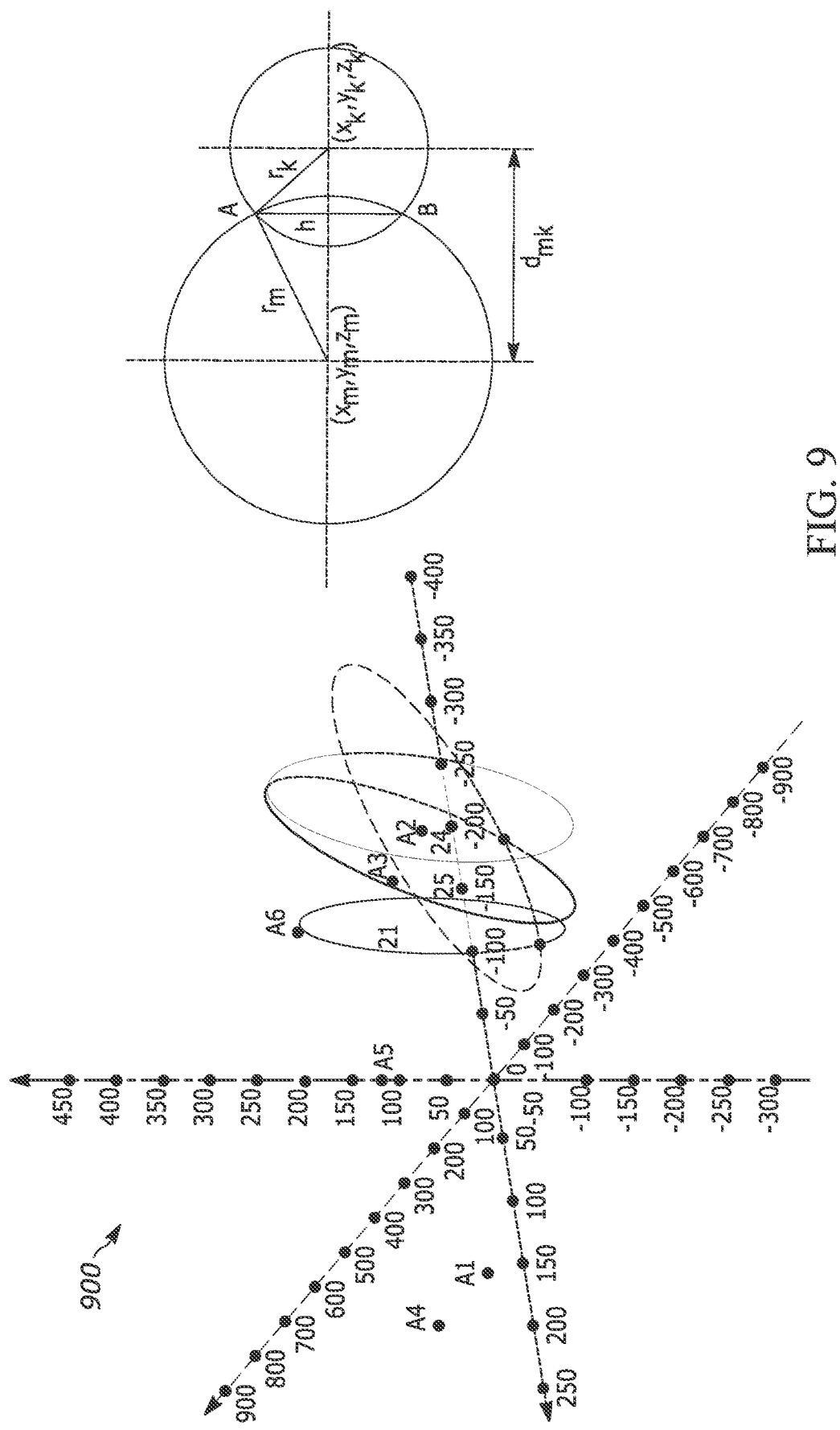
FIG. 9 generally illustrates the mathematical foundations of the constrained sphere calculation, according to the principles of the present disclosure.

FIG. 9 generally illustrates the mathematical foundations of the constrained sphere calculation. In the calculation 900, once the range compensation is applied, the systems and methods described herein calculate intersection points for each pair of intersecting circles. Each pair of sensors with intersecting range spheres will create an intersecting circle.

The calculation 900 may include nearest neighbor (k-NN) clustering, where clusters with the largest number of intersection points are determined and the centroid of that cluster is chosen as the origin. Median, mean, or other statistical computations of those cluster points may also be chosen as a solution. The distance to each sensor is calculated from this point. The calculation 900 may autocorrect the reported ranges for the sensors where the new range difference is above a given threshold (e.g., 20 cm or 20%) before proceeding to estimate the location of the tag device. This may be one of the possibilities for parameter correction. In such a case, there is a benefit to utilizing all the sensors to determine the starting point, however that benefit is at the expense of higher computational demands.

The calculation 900 may derive the equations of all the circles of the intersection of the sphere pairs. The calculation 900 may be configured to solve pairwise in order to find the intersection points of the circles by iterating over the specified domain of t and considering the points that satisfy both circle equations under consideration. The calculation 900 may be configured to iterate through the values of t between $[0, 2\pi]$ and take the resultant points that are common between any two parametric equations of circle of intersection spheres. These points form the set of all intersection points of the circle of intersections of spheres taken two at a time. The radius of the intersecting circle is determined by:

$$r = \frac{\sqrt{4r_m^2 d_{mk}^2 - (r_m^2 + d_{mk}^2 - r_k^2)^2}}{2d_{mk}}$$

The equation of the plane that contains the circle of intersection of the sphere is given in the general form as:

$$AX+BY+CZ+D=0$$

The parametric equation of the line that connects the center of the two intersecting spheres and passes through the above plane is given as:

$$+t(x_k^2 - x_m^2), y = y_m + t(y_k^2 - y_m^2) \text{ and } z = z_m + t(z_k^2 - z_m^2)$$

Where, parameter t is given by:

$$t = \frac{Ax_m + By_m + Cz_m + D}{A(x_m - x_k) + B(y_m - y_k) + C(z_m - z_k)}$$

Replacing t in the parametric equation of the line yields the center of the circle of intersection $(x_c, y_c, z_c)$. Solving for a point on the circle of intersection, which is r Cartesian distance away from the center of the circle to calculate $(x_p, y_p, z_p)$. The calculation 900 defines a unit vector $\hat{i}$ with the two points $(x_c, y_c, z_c)$ and $(x_p, y_p, z_p)$. A unit vector k perpendicular to the plane of intersection is defined using plane equation and $(x_c, y_c, z_c)$. The calculation 900 may derive a unit vector orthogonal to IS and parallel to the intersecting plane as $\hat{j}=\hat{i}\times\hat{k}$. Now the calculation 900 may define the parametric equation of the circle of intersection of two spheres as:

$$p(t)=(x_c,y_c,z_c)+r\cos(t)\hat{i}+r\sin(t)\hat{j}, \text{ where } 0 \leq t \leq 2\pi$$

Figure 10:
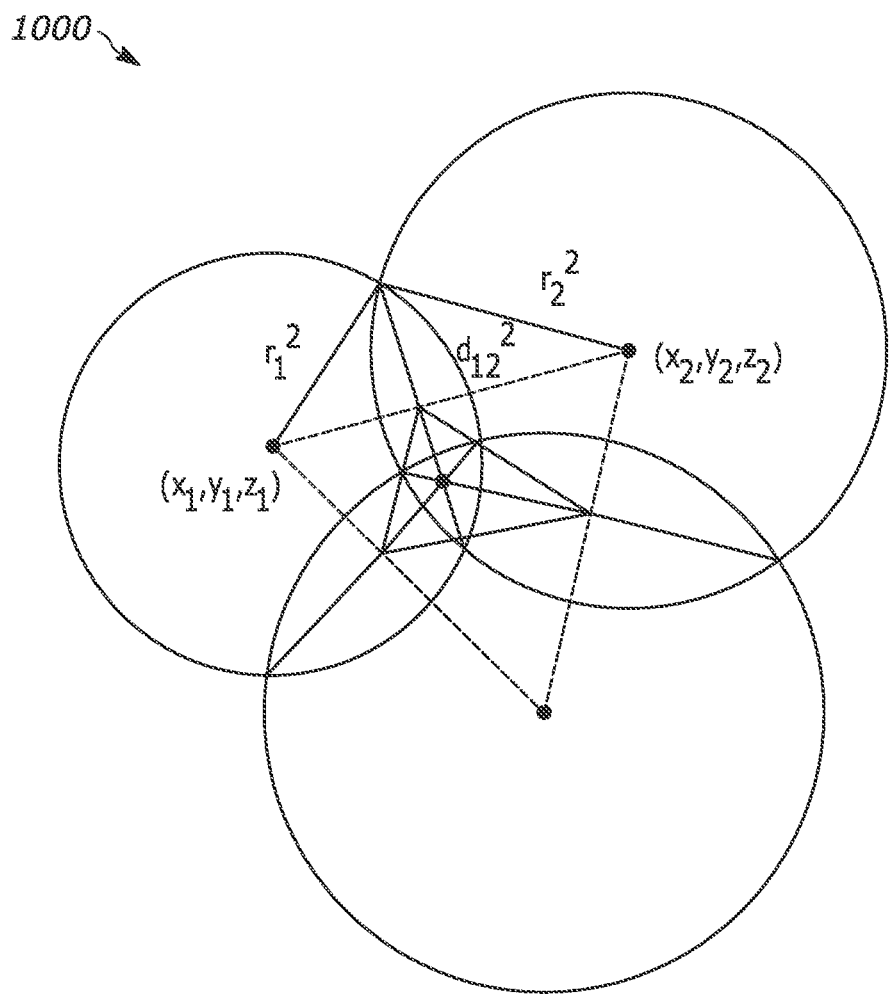
FIG. 10 generally illustrates the mathematical foundations of the 3D centroid calculation, according to the principles of the present disclosure.

FIG. 10 generally illustrates the mathematical foundations of the 3D centroid calculation. The calculation 1000 requires a minimum of three sensors reporting localization data in order to perform the calculation. The calculation 1000 calculates the center of each intersection circle. The starting point is the mean value of the coordinates of the center point of these intersection circles. The calculation 1000 minimizes the computational overhead of the constrained sphere calculation. While considering more than 3 anchors the calculation 1000 has two options: it may consider all of the chosen ones in the set (around four) at once leading to six intersection circles. The seeding point in that case may be the mean, median, middle or another statistical computation point of those six centers of intersecting circles.

The calculation 1000 estimates the center point for intersecting area of three spheres. The calculation 1000 estimates the center of the circle formed by a given pair of intersecting spheres. Where $(x_1, y_1, z_1)$ and $(x_2, y_2, z_2)$ are coordinates of a given sensors 1 and 2 with respective distance to tag device as $r_1$ and $r_2$. Further, the distance between these sensors is $d_{12}$. The estimation calculation is as follows:

$$(x_{12}, y_{12}, z_{12}) = \left(\frac{x_1+x_2}{2} + \frac{(x_2-x_1)(r_1^2-r_2^2)}{2d_{12}^2},\right.$$
$$\left.\frac{y_1+y_2}{2} + \frac{(y_2-y_1)(r_1^2-r_2^2)}{2d_{12}^2}, \frac{z_1+z_2}{2} + \frac{(z_2-z_1)(r_1^2-r_2^2)}{2d_{12}^2}\right)$$

In the case where spheres do not intersect, take the mean values as:

$$\left[\frac{x_1+x_2}{2}, \frac{y_1+y_2}{2}, \frac{z_1+z_2}{2}\right]$$

Each pair of sensors should give one such point, centroid of the triangle formed by the three points will be the estimation:

$$\left(\frac{x_{12}+x_{23}+x_{31}}{3}, \frac{y_{12}+y_{23}+y_{31}}{3}, \frac{z_{12}+z_{23}+z_{31}}{3}\right)$$

In a scenario where four sensors are available, the centroid mean is calculated as:

$$\left(\frac{x_{12}+x_{23}+x_{31}+x_{14}+x_{24}+x_{34}}{6},\right.$$
$$\left.\frac{y_{12}+y_{23}+y_{31}+y_{14}+y_{24}+y_{34}}{6}, \frac{z_{12}+z_{23}+z_{31}+z_{14}+z_{24}+z_{34}}{6}\right)$$

In a scenario where four sensors are available, the centroid median is calculated as:

$$\{(x_{12},x_{23},x_{31},x_{14},x_{24},x_{34}),(y_{12},y_{23},y_{31},y_{14},y_{24},y_{34}),(z_{12},z_{23},z_{31},z_{14},z_{24},z_{34})\}$$

In a scenario where four sensors are available, the centroid middle is calculated as:

$$\{(x_{12},x_{23},x_{31},x_{14},x_{24},x_{34}),(y_{12},y_{23},y_{31},y_{14},y_{24},y_{34}),(z_{12},z_{23},z_{31},z_{14},z_{24},z_{34})\}$$

Figure 11:
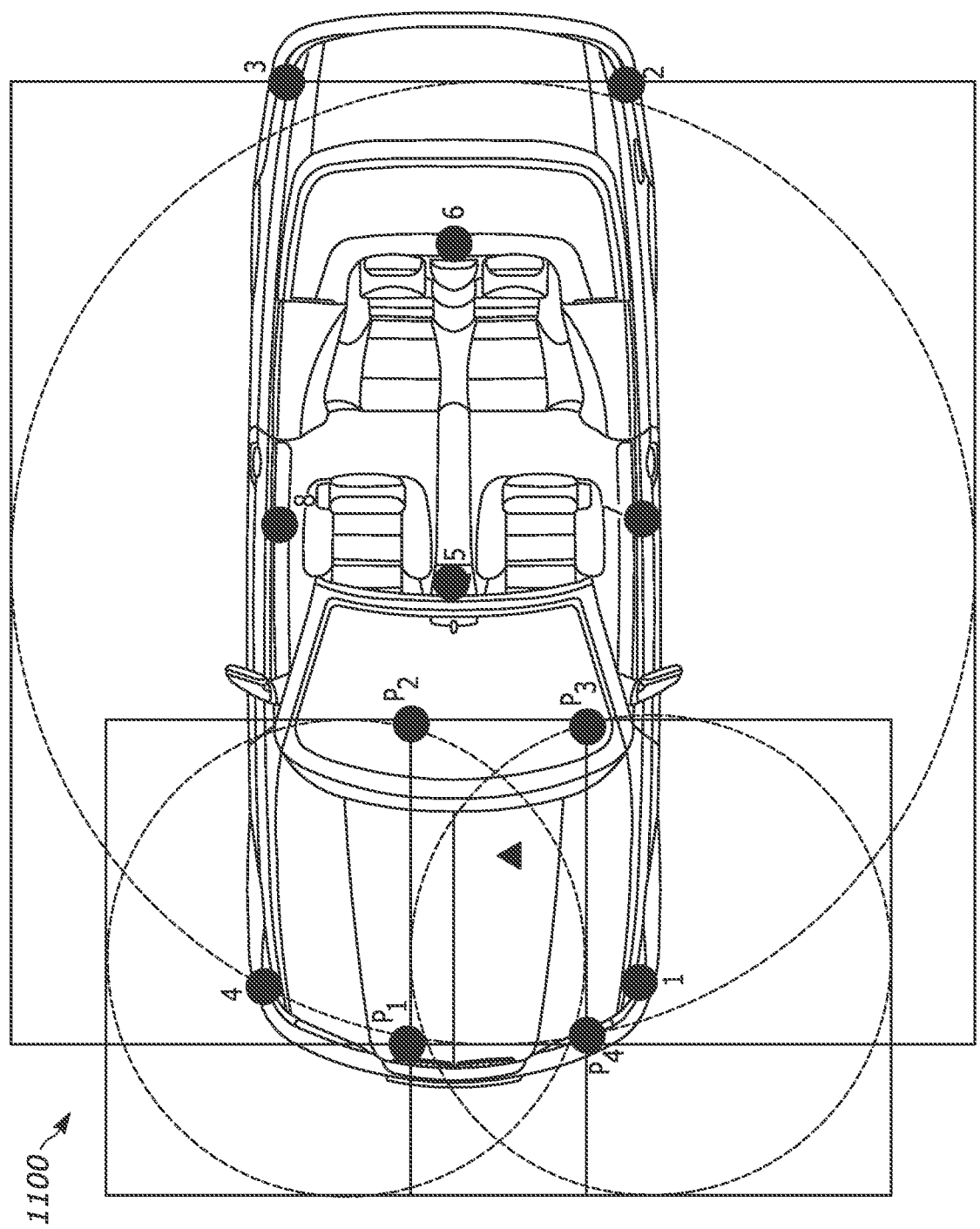
FIG. 11 generally illustrates the mathematical foundations of the bounding box calculation, according to the principles of the present disclosure.

FIG. 11 generally illustrates the mathematical foundations of the bounding box calculation. The calculation 1100 performs weighted average of selected bounding points. Bounding points for the calculation 1100 are the coordinates of the common cuboid. The calculation 1100 determines the cuboid which is common to all cuboids formed by enclosing the ranger spheres as illustrated in FIG. 11.

Where $(x_n, y_n, z_n)$ represent the coordinates of the sensors and r n is the localization value reported by a sensor, the following is used:

$X_{diff}^{min} = \min \cup_{i=1}^{n} X_n - r_n \quad X_{add}^{min} = \min \cup_{i=1}^{n} X_n + r_n$ $X_{diff}^{max} = \max \cup_{i=1}^{n} X_n - r_n \quad X_{add}^{max} = \max \cup_{i=1}^{n} X_n + r_n$ $Y_{diff}^{min} = \min \cup_{i=1}^{n} Y_n - r_n \quad Y_{add}^{min} = \min \cup_{i=1}^{n} Y_n + r_n$ $Y_{diff}^{max} = \max \cup_{i=1}^{n} Y_n - r_n \quad Y_{add}^{max} = \max \cup_{i=1}^{n} Y_n + r_n$ $Z_{diff}^{min} = \min \cup_{i=1}^{n} Z_n - r_n \quad Z_{add}^{min} = \min \cup_{i=1}^{n} Z_n + r_n$ $Z_{diff}^{max} = \max \cup_{i=1}^{n} Z_n - r_n \quad Z_{add}^{max} = \max \cup_{i=1}^{n} Z_n + r_n$ Coordinates for common bonding box is then given by:

$$V = \begin{Bmatrix} (X_{diff}^{max}, Y_{diff}^{max}, Z_{diff}^{max}), & (X_{diff}^{max}, Y_{add}^{min}, Z_{diff}^{max}), & (X_{add}^{min}, Y_{add}^{min}, Z_{diff}^{max}), & (X_{add}^{min}, Y_{diff}^{max}, Z_{diff}^{max}), \\ (X_{diff}^{max}, Y_{diff}^{max}, Z_{add}^{min}), & (X_{diff}^{max}, Y_{add}^{min}, Z_{add}^{min}), & (X_{add}^{min}, Y_{add}^{min}, Z_{add}^{min}), & (X_{add}^{min}, Y_{diff}^{max}, Z_{add}^{min}) \end{Bmatrix}$$

Tag device point is then calculated as:

$$\left[ \frac{X_{diff}^{max} + X_{add}^{min}}{2}, \frac{Y_{diff}^{max} + Y_{add}^{min}}{2}, \frac{Z_{diff}^{max} + Z_{add}^{min}}{2} \right]$$

Figure 12:
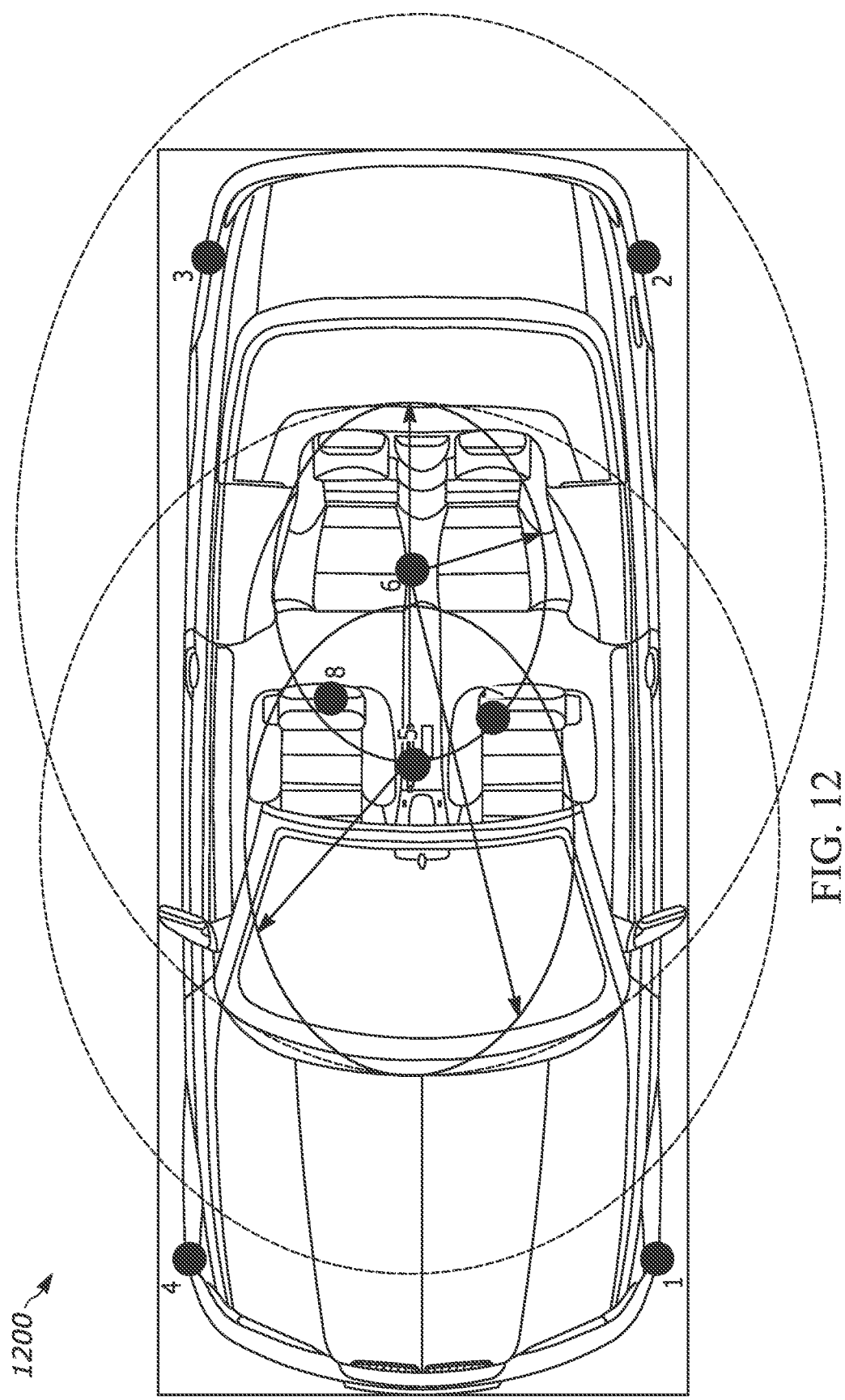
FIG. 12 generally illustrates the mathematical foundations of the bounding box calculation, according to the principles of the present disclosure.

FIG. 12 illustrates some possible combination of range and signal quality-based processes to determine inside/outside zones. Values from multiple sensors can be used to create specialized zones of interest. Once a zone is determined, RF (radio frequency) fingerprinting technique could also be used to determine location.

In such case the localization block could be totally optional. In cases when localization block is used, Kalman filter can also be used on localization output. This will work well for scenarios when the tag device is within the enclosed area of sensors, otherwise, this may result in poor UX.

In some embodiments, the method for localizing a signal includes a processor and a memory. The memory includes instructions that, when executed by the processor, cause the processor to receive, for each sensor of a plurality of sensors, one or more localization values indicating an estimated distance between a tag device and a respective sensor of the plurality of sensors. The method described herein may be configured to further identify a first sensor of the plurality of sensors having a localization value that is less than localization values associated with each other sensor of the plurality of sensors. The method described herein may be configured to identify, based on the first sensor and a geometric relationship between the first sensor and the plurality of sensors, a subset of sensors of the plurality of sensors. The method may be configured to calculate an estimated location of the tag device relative to the subset of sensors based on one or more distances between the first sensor and at least two other sensors of the subset of sensors.

The method may include, in response to determining that a threshold number of consecutive localization values from a respective sensor of the plurality of sensors have an invalid value, disregarding localization values from the respective sensor.

The method may include applying triangle inequality theorem to the localization values of each sensor of the plurality of sensors; and identifying, in response to applying the triangle inequality theorem to the localization values of each sensor of the plurality of sensors, localization values that are impossible based on one or more relative positions of the plurality of sensors.

The method may include multiplying identified impossible localization values by a compensation factor.

The method may include determining a Cramer-Rao Lower Bound score for the localization values of the plurality of sensors; and ranking the plurality of sensors based on the respective Cramer-Rao Lower Bound score.

The method may include calculating the estimated location of the tag device by applying a gradient descent algorithm to the localization values received from the subset of sensors.

The method may include determining whether the estimated location of the tag device is in an area of interest having a prestored radio frequency fingerprinting datum; and updating the estimated location of the tag device based on comparing a received radio frequency signal with the prestored radio frequency fingerprinting datum.

The method may include receiving a command from the tag device; and executing an action based on the command, the estimated location of the tag device, and a location of a sensor of the plurality of sensors.

The method may include, in response to a determination of signal quality, applying a localization factor to the localization values of each sensor of the plurality of sensors. The localization factor being calculated using classification and/or regression models over signal quality parameters to minimize the error in localization values.

The method may include applying a constrained sphere calculation to the localization values of each sensor of the plurality of sensors The method may include determining which subset of sensors sharing a geometric relationship reports the shortest average distance between the subset of sensors and the tag device.

The method may include, applying a bias compensation value to the localization values reported by each sensor of the subset of sensors, the bias compensation factor being calculated based on a mean error reported by the sensor, of the subset of sensors, reporting the shortest distance from the tag device. This mean error could be simple signed mean error or absolute mean error or root mean square error of the error distribution.

In some embodiments, the method may include the localization values being based in party on an estimated distance between the respective sensor and the tag device; and the first sensor reports the least distance to the tag device.

In some embodiments, the method may include localization values being based in party on the location of the sensor; and the first sensor is chosen based on pre-determined preferred location in the vehicle.

In some embodiments, the method may include localization values being based in part on a channel impulse response of received signal at the sensor from the tag; determine channel quality based on received channel impulse response; and select the node reporting best channel quality as the first node.

In some embodiments, the method may include applying the Kalman filter to valid localization values for each sensor, determining difference of consecutive localization values for each valid sensor values, resetting the Kalman filter when majority sensors report differences greater than pre-determine threshold.

In some embodiments, the method may include applying a localization factor to the localization values of each sensor of the plurality of sensors; in response to a determination of signal quality, wherein the factor value increases with decrease in signal quality; in response to estimated target distance, wherein the factor value increases with distance.

In some embodiments, the method may include applying geometric bounding methods to calculate the estimated location of the tag device; wherein geometric bounding may include spherical or cuboid bounding in 3-D and circular or rectangular bounding in 2-D; reporting the estimated location as final solution if the mean square error of calculated ranges from the estimated location of the tag and reported ranges from chosen subset of sensors is less than pre-determined threshold.

In some embodiments, the method may include selecting a sensor group from a set of pre-determined sensor groups sharing a geometric relationship; wherein the geometric relationship is defined as sensors forming a parallelogram or 'Y' shape in x-y plane; wherein geometric relationship is defined as having a condition number of set of sensors less than pre-determined threshold; wherein in case of multiple sensor groups are selected, tie is broken by determining which sensor group reports the shortest average distance between the sensors in the group and the tag device.

In some embodiments, the method may include applying a bias compensation value to the localization values reported by each sensor of the subset of sensors; wherein the bias compensation value being calculated based on a mean error reported by the sensor, of the subset of sensors, reporting the shortest distance from the tag device; wherein the bias compensation factor being calculated based on a mean error reported by the respective sensor reporting the shortest distance from the tag device.

In some embodiments, the method may include calculating the estimated location of the tag device by utilizing theoretical equations when the condition number of chosen subset of sensors is less than a given threshold; reporting this estimated location as final solution if the mean square error of calculated ranges from the estimated location of the tag and reported ranges from chosen subset of sensors is less than pre-determined threshold.

In some embodiments, the system for localizing a signal includes a processor and a memory. The memory includes instructions that, when executed by the processor, cause the processor to receive, for each sensor of a plurality of sensors, one or more localization values indicating an estimated distance between a tag device and a respective sensor of the plurality of sensors. The system described herein may be configured to further identify a first sensor of the plurality of sensors having a localization value that is less than localization values associated with each other sensor of the plurality of sensors. The system described herein may be configured to identify, based on the first sensor and a geometric relationship between the first sensor and the plurality of sensors, a subset of sensors of the plurality of sensors. The system may be configured to calculate an estimated location of the tag device relative to the subset of sensors based on one or more distances between the first sensor and at least two other sensors of the subset of sensors.

In some embodiments the system may include, in response to determining that a threshold number of consecutive localization values from a respective sensor of the plurality of sensors have an invalid value, disregarding localization values from the respective sensor.

In some embodiments the system may include applying triangle inequality theorem to the localization values of each sensor of the plurality of sensors; and identifying, in response to applying the triangle inequality theorem to the localization values of each sensor of the plurality of sensors, localization values that are impossible based on one or more relative positions of the plurality of sensors.

In some embodiments the system may include multiplying identified impossible localization values by a compensation factor.

In some embodiments the system may include determining a Cramer-Rao Lower Bound score for the localization values of the plurality of sensors; and ranking the plurality of sensors based on the respective Cramer-Rao Lower Bound score.

In some embodiments the system may include calculating the estimated location of the tag device by applying a gradient descent algorithm to the localization values received from the subset of sensors.

In some embodiments the system may include determining whether the estimated location of the tag device is in an area of interest having a prestored radio frequency fingerprinting datum; and updating the estimated location of the tag device based on comparing a received radio frequency signal with the prestored radio frequency fingerprinting datum.

In some embodiments the system may include receiving a command from the tag device; and executing an action based on the command, the estimated location of the tag device, and a location of a sensor of the plurality of sensors.

In some embodiments the system may include, in response to a determination of signal quality, applying a localization factor to the localization values of each sensor of the plurality of sensors. The localization factor being calculated using classification and/or regression models over signal quality parameters to minimize the error in localization values.

In some embodiments the system may include applying a constrained sphere calculation to the localization values of each sensor of the plurality of sensors In some embodiments the system may include determining which subset of sensors sharing a geometric relationship reports the shortest average distance between the subset of sensors and the tag device.

In some embodiments the system may include, applying a bias compensation value to the localization values reported by each sensor of the subset of sensors, the bias compensation factor being calculated based on a mean error reported by the sensor, of the subset of sensors, reporting the shortest distance from the tag device. This mean error could be simple signed mean error or absolute mean error or root mean square error of the error distribution.

In some embodiments the system may include the localization values being based in party on an estimated distance between the respective sensor and the tag device; and the first sensor reports the least distance to the tag device.

In some embodiments, the system may include localization values being based in party on the location of the sensor; and the first sensor is chosen based on pre-determined preferred location in the vehicle.

In some embodiments, the system may include localization values being based in part on a channel impulse response of received signal at the sensor from the tag;

determine channel quality based on received channel impulse response; and select the node reporting best channel quality as the first node.

In some embodiments, the system may include applying the Kalman filter to valid localization values for each sensor, determining difference of consecutive localization values for each valid sensor values, resetting the Kalman filter when majority sensors report differences greater than pre-determine threshold.

In some embodiments, the system may include applying a localization factor to the localization values of each sensor of the plurality of sensors; in response to a determination of signal quality, wherein the factor value increases with decrease in signal quality; in response to estimated target distance, wherein the factor value increases with distance.

In some embodiments, the system may include applying geometric bounding methods to calculate the estimated location of the tag device; wherein geometric bounding may include spherical or cuboid bounding in 3-D and circular or rectangular bounding in 2-D; reporting the estimated location as final solution if the mean square error of calculated ranges from the estimated location of the tag and reported ranges from chosen subset of sensors is less than pre-determined threshold.

In some embodiments, the system may include selecting a sensor group from a set of pre-determined sensor groups sharing a geometric relationship; wherein the geometric relationship is defined as sensors forming a parallelogram or 'Y' shape in x-y plane; wherein geometric relationship is defined as having a condition number of set of sensors less than pre-determined threshold; wherein in case of multiple sensor groups are selected, tie is broken by determining which sensor group reports the shortest average distance between the sensors in the group and the tag device.

In some embodiments, the system may include applying a bias compensation value to the localization values reported by each sensor of the subset of sensors; wherein the bias compensation value being calculated based on a mean error reported by the sensor, of the subset of sensors, reporting the shortest distance from the tag device; wherein the bias compensation factor being calculated based on a mean error reported by the respective sensor reporting the shortest distance from the tag device.

In some embodiments, the system may include calculating the estimated location of the tag device by utilizing theoretical equations when the condition number of chosen subset of sensors is less than a given threshold; reporting this estimated location as final solution if the mean square error of calculated ranges from the estimated location of the tag and reported ranges from chosen subset of sensors is less than pre-determined threshold.

In some embodiments the apparatus may include localizing a signal. In some embodiments the apparatus includes a processor and a memory. In some embodiments the memory includes instructions that, when executed by the processor, cause the processor to receive, for each sensor of a plurality of sensors, one or more localization values indicating an estimated distance between a tag device and a respective sensor of the plurality of sensors. In some embodiments the apparatus identifies a first sensor of the plurality of sensors having a localization value that is less than localization values associated with each other sensor of the plurality of sensors. In some embodiments the apparatus also identify, based on the first sensor and a geometric relationship between the first sensor and the plurality of sensors, a subset of sensors of the plurality of sensors. In some embodiments the apparatus also calculate an estimated location of the tag device relative to the subset of sensors based on one or more distances between the first sensor and at least two other sensors of the subset of sensors. In some embodiments the apparatus also, in response to determining that a threshold number of consecutive localization values from a respective sensor of the plurality of sensors have an invalid value, disregarding localization values from the respective sensor. In some embodiments the apparatus determines whether the estimated location of the tag device is in an area of interest having a prestored radio frequency fingerprinting datum. In some embodiments the apparatus also update the estimated location of the tag device based on comparing a received radio frequency signal with the prestored radio frequency fingerprinting datum.

In some embodiments the apparatus may further cause the processor to, apply triangle inequality theorem to the localization values of each sensor of the plurality of sensors; and identify, in response to applying the triangle inequality theorem to the localization values of each sensor of the plurality of sensors, localization values that are impossible based on one or more relative positions of the plurality of sensors.

In some embodiments the apparatus may further cause the processor to, multiply identified impossible localization values by a compensation factor.

In some embodiments the apparatus may further cause the processor to, receive a command from the tag device; and execute an action based on the command, the estimated location of the tag device, and a location of a sensor of the plurality of sensors.

In some embodiments the apparatus may include, in response to a determination of signal quality, applying a localization factor to the localization values of each sensor of the plurality of sensors. The localization factor being calculated using classification and/or regression models over signal quality parameters to minimize the error in localization values.

In some embodiments the apparatus may include applying a constrained sphere calculation to the localization values of each sensor of the plurality of sensors In some embodiments the apparatus may include determining which subset of sensors sharing a geometric relationship reports the shortest average distance between the subset of sensors and the tag device.

In some embodiments the apparatus may include, applying a bias compensation value to the localization values reported by each sensor of the subset of sensors, the bias compensation factor being calculated based on a mean error reported by the sensor, of the subset of sensors, reporting the shortest distance from the tag device. This mean error could be simple signed mean error or absolute mean error or root mean square error of the error distribution.

In some embodiments the apparatus may include the localization values being based in party on an estimated distance between the respective sensor and the tag device; and the first sensor reports the least distance to the tag device.

In some embodiments, the apparatus may include localization values being based in party on the location of the sensor; and the first sensor is chosen based on pre-determined preferred location in the vehicle.

In some embodiments, the apparatus may include localization values being based in part on a channel impulse response of received signal at the sensor from the tag; determine channel quality based on received channel impulse response; and select the node reporting best channel quality as the first node.

In some embodiments, the apparatus may include applying the Kalman filter to valid localization values for each sensor, determining difference of consecutive localization values for each valid sensor values, resetting the Kalman filter when majority sensors report differences greater than pre-determine threshold.

In some embodiments, the apparatus may include applying a localization factor to the localization values of each sensor of the plurality of sensors; in response to a determination of signal quality, wherein the factor value increases with decrease in signal quality; in response to estimated target distance, wherein the factor value increases with distance.

In some embodiments, the apparatus may include applying geometric bounding methods to calculate the estimated location of the tag device; wherein geometric bounding may include spherical or cuboid bounding in 3-D and circular or rectangular bounding in 2-D; reporting the estimated location as final solution if the mean square error of calculated ranges from the estimated location of the tag and reported ranges from chosen subset of sensors is less than pre-determined threshold.

In some embodiments, the apparatus may include selecting a sensor group from a set of pre-determined sensor groups sharing a geometric relationship; wherein the geometric relationship is defined as sensors forming a parallelogram or 'Y' shape in x-y plane; wherein geometric relationship is defined as having a condition number of set of sensors less than pre-determined threshold; wherein in case of multiple sensor groups are selected, tie is broken by determining which sensor group reports the shortest average distance between the sensors in the group and the tag device.

In some embodiments, the apparatus may include applying a bias compensation value to the localization values reported by each sensor of the subset of sensors; wherein the bias compensation value being calculated based on a mean error reported by the sensor, of the subset of sensors, reporting the shortest distance from the tag device; wherein the bias compensation factor being calculated based on a mean error reported by the respective sensor reporting the shortest distance from the tag device.

In some embodiments, the apparatus may include calculating the estimated location of the tag device by utilizing theoretical equations when the condition number of chosen subset of sensors is less than a given threshold; reporting this estimated location as final solution if the mean square error of calculated ranges from the estimated location of the tag and reported ranges from chosen subset of sensors is less than pre-determined threshold.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for localizing a signal, the method comprising:
   receiving, for each sensor of a plurality of sensors associated with a vehicle, one or more localization values indicating an estimated distance between a tag device and a respective sensor of the plurality of sensors;
   identifying a first sensor of the plurality of sensors having a localization value that is less than localization values associated with each other sensor of the plurality of sensors;
   identifying, based on the first sensor and a geometric relationship between the first sensor and each other sensor of the plurality of sensors, a subset of sensors of the plurality of sensors, wherein the geometric relationship between the first sensor and the subset of sensors of the plurality of sensors includes a symmetrical geometry; and
   calculating an estimated location of the tag device relative to the subset of sensors based on one or more distances between the first sensor and at least two other sensors of the subset of sensors.

2. The method of claim 1, further comprising, wherein the first sensor is selected from the plurality of sensors, based on a shortest received estimated distance between the tag device and a respective sensor.

3. The method of claim 1, further comprising:
   determining a channel quality value of each sensor of the plurality of sensors based on the respective channel state information; and
   selecting the first sensor of the plurality of sensors based in part on channel quality values of the plurality of sensors.

4. The method of claim 1, further comprising, determining a Cramer-Rao Lower Bound score for localization values of the plurality of sensors; and ranking the plurality of sensors based on the Cramer-Rao Lower Bound score.

5. The method of claim 1, further comprising, applying a filter to the one or more localization values received from the plurality of sensors; and
   determining differences between consecutive localization values for each sensor value;
   applying a reset to the filter when a majority of sensors report differences greater than a pre-determine threshold.

6. The method of claim 1, further comprising, determining whether the estimated location of the tag device is in an area of interest having a prestored radio frequency fingerprinting datum; and
   updating the estimated location of the tag device based on comparing a received radio frequency signal with the prestored radio frequency fingerprinting datum.

7. The method of claim 1, further comprising, receiving a command from the tag device; and
   executing an action based on the command, the estimated location of the tag device, and a location of a sensor of the plurality of sensors.

8. A system for localizing a signal, the system includes:
   a processor, and a memory including instructions that, when executed by the processor, cause the processor to:

receive, for each sensor of a plurality of sensors associated with a vehicle, one or more localization values indicating an estimated distance between a tag device and a respective sensor of the plurality of sensors;

identify a first sensor of the plurality of sensors having a localization value that is less than localization values associated with each other sensor of the plurality of sensors;

identify, based on the first sensor and a geometric relationship between the first sensor and each other sensor of the plurality of sensors, a subset of sensors of the plurality of sensors, wherein the geometric relationship between the first sensor and the subset of sensors of the plurality of sensors includes a symmetrical geometry; and calculate an estimated location of the tag device relative to the subset of sensors based on one or more distances between the first sensor and at least two other sensors of the subset of sensors calculate, after a predetermined period of time, a second location of the tag device relative to the subset of sensors.

9. The system of claim 8, wherein instructions further cause the processor to, in response to determining that a threshold number of consecutive localization values from a respective sensor of the plurality of sensors have an invalid value, disregarding localization values from the respective sensor.

10. The system of claim 8, wherein instructions further cause the processor to, apply triangle inequality theorem to localization values of each sensor of the plurality of sensors; and identify, in response to applying the triangle inequality theorem to the localization values of each sensor of the plurality of sensors, localization values that are impossible based on one or more relative positions of the plurality of sensors.

11. The system of claim 8, wherein instructions further cause the processor to, in response to a determination of signal quality, applying a localization factor to the localization values of each sensor of the plurality of sensors.

12. The system of claim 8, wherein instructions further cause the processor to, apply a geometric bounding calculation to the localization values of each sensor of the plurality of sensors.

13. The system of claim 8, wherein instructions further cause the processor to:

determine which predetermined subset of sensors sharing a geometric relationship reports a shortest average distance between the subset of sensors and the tag device.

14. The system of claim 13, wherein instructions further cause the processor to, apply a bias compensation value to the localization values reported by each sensor of the subset of sensors, the bias compensation value being calculated based on a mean error reported by each sensor, of the subset of sensors, and reporting a shortest distance from the tag device.

15. The system of claim 8, wherein instructions further cause the processor to, calculate the estimated location of the tag device by applying a gradient descent algorithm to the localization values received from the subset of sensors.

16. The system of claim 8, wherein instructions further cause the processor to, determine whether the estimated location of the tag device is in an area of interest having a prestored radio frequency fingerprinting datum; and update the estimated location of the tag device based on comparing a received radio frequency signal with the prestored radio frequency fingerprinting datum.

17. The system of claim 8, wherein instructions further cause the processor to, receive a command from the tag device; and execute an action based on the command, the estimated location of the tag device, and a location of a sensor of the plurality of sensors.

18. An apparatus for localizing a signal, the apparatus includes:

a processor; and a memory including instructions that, when executed by the processor, cause the processor to:

receive, for each sensor of a plurality of sensors associated with a vehicle, one or more localization values indicating an estimated distance between a tag device and a respective sensor of the plurality of sensors;

identify a first sensor of the plurality of sensors having a localization value that is less than localization values associated with each other sensor of the plurality of sensors;

identify, based on the first sensor and a geometric relationship between the first sensor and each other sensor of the plurality of sensors, a subset of sensors of the plurality of sensors, wherein the geometric relationship between the first sensor and the subset of sensors of the plurality of sensors includes a symmetrical geometry;

calculate an estimated location of the tag device relative to the subset of sensors based on one or more distances between the first sensor and at least two other sensors of the subset of sensors;

in response to determining that a threshold number of consecutive localization values from a respective sensor of the plurality of sensors have an invalid value, disregarding localization values from the respective sensor;

determine whether the estimated location of the tag device is in an area of interest having a prestored radio frequency fingerprinting datum; and update the estimated location of the tag device based on comparing a received radio frequency signal with the prestored radio frequency fingerprinting datum.

19. The apparatus of claim 18, wherein instructions further cause the processor to, apply triangle inequality theorem to localization values of each sensor of the plurality of sensors; and identify, in response to applying the triangle inequality theorem to the localization values of each sensor of the plurality of sensors, localization values that are impossible based on one or more relative positions of the plurality of sensors.

20. The apparatus of claim 18, wherein instructions further cause the processor to, receive a command from the tag device; and execute an action based on the command, the estimated location of the tag device, and a location of a sensor of the plurality of sensors.

* * * * *